(12) United States Patent
Wang et al.

(10) Patent No.: US 11,702,288 B2
(45) Date of Patent: Jul. 18, 2023

(54) WAREHOUSING APPARATUS AND SYSTEM AND CONTROL METHOD

(71) Applicant: SHANGHAI QUICKTRON INTELLIGENT TECHNOLOGY CO., LTD, Shanghai (CN)

(72) Inventors: Xinhao Wang, Shanghai (CN); Dan Tang, Shanghai (CN); Yangwei Zou, Shanghai (CN); Yundi He, Shanghai (CN); Wei Yang, Shanghai (CN)

(73) Assignee: SHANGHAI QUICKTRON INTELLIGENT TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/878,577

(22) Filed: Aug. 1, 2022

(65) Prior Publication Data
US 2022/0363479 A1    Nov. 17, 2022

Related U.S. Application Data

(63) Continuation of application No. PCT/CN2021/070888, filed on Jan. 8, 2021.

(30) Foreign Application Priority Data

Mar. 27, 2020   (CN) .......................... 202010231545.9
Mar. 27, 2020   (CN) .......................... 202010231552.9
(Continued)

(51) Int. Cl.
G06F 7/00      (2006.01)
B65G 1/137     (2006.01)
B65G 1/04      (2006.01)

(52) U.S. Cl.
CPC ......... *B65G 1/1375* (2013.01); *B65G 1/0471* (2013.01)

(58) Field of Classification Search
CPC ................................................... B65G 1/1375
(Continued)

(56) References Cited

U.S. PATENT DOCUMENTS

2018/0127212 A1*   5/2018   Jarvis ........................ B60P 1/00
2020/0031578 A1    1/2020   Lisso et al.
2020/0087070 A1    3/2020   Kakinuki

FOREIGN PATENT DOCUMENTS

CN      205405721 U    7/2016
CN      205891856 U    1/2017
(Continued)

OTHER PUBLICATIONS

PCT International Search Report (w/ English translation) and Written Opinion for corresponding PCT Application No. PCT/CN2021/070888, dated Apr. 9, 2021, 10 pages.
(Continued)

*Primary Examiner* — Yolanda R Cumbess
(74) *Attorney, Agent, or Firm* — Dority & Manning, P.A.

(57) ABSTRACT

A warehousing apparatus including a temporary storage layer board used for providing a temporary storage station, and a plurality of shelves with each shelf including at least one storage layer board and a plurality of stand columns arranged at intervals in a horizontal direction. The storage layer board is spaced apart from the temporary storage layer board in a vertical direction by means of a stand column, and the storage layer board is used for providing a storage position, a first robot passage in which a first robot travels and a second robot passage in which a second robot travels.

23 Claims, 19 Drawing Sheets

(30) Foreign Application Priority Data

Mar. 27, 2020 (CN) .......................... 202010232310.1
Sep. 2, 2020 (CN) .......................... 202021892576.0
Oct. 15, 2020 (CN) .......................... 202022292766.5

(58) Field of Classification Search
USPC .......................... 700/213–214, 218, 223, 228
See application file for complete search history.

(56) References Cited

FOREIGN PATENT DOCUMENTS

| | | | |
|---|---|---|---|
| CN | 108482925 | A | 9/2018 |
| CN | 109048952 | A | 12/2018 |
| CN | 109987366 | A * | 7/2019 |
| CN | 109987366 | A | 7/2019 |
| CN | 110603209 | A | 12/2019 |
| CN | 110654760 | A | 1/2020 |
| CN | 210162597 | U | 3/2020 |
| CN | 111232530 | A | 6/2020 |
| CN | 111361908 | A | 7/2020 |
| CN | 111453275 | A | 7/2020 |
| EP | 3728079 | A1 | 10/2020 |
| JP | WO2019008999 | A1 | 12/2019 |
| JP | 6777232 | B2 | 10/2020 |
| KR | 20200003847 | A | 1/2020 |
| WO | WO2019008999 | A1 | 1/2019 |
| WO | WO2019123254 | A1 | 6/2019 |

OTHER PUBLICATIONS

PCT International Search Report (w/ English translation) for PCT Application No. PCT/CN2021/070889, dated Apr. 22. 2021, 7 pages.

First Chinese Office Action (w/ English translation) for correspond in Cn Application No. 202010231545.9, dated Feb. 20, 2021, 19 pages.

Chinese Search Report (w/ English translation) for corresponding Chinese Application No. 2020102323101, dated Feb. 26, 2021, 4 pages.

Chinese First Office Action (w/ English translation) for corresponding Chinese Application No. 2020102323101, dated Mar. 3, 2021, 16 pages.

* cited by examiner

WAREHOUSING APPARATUS AND SYSTEM AND CONTROL METHOD

The present disclosure is a continuation of International Patent Application No. PCT/CN2021/070888, filed on Jan. 8, 2021, which is incorporated herein by reference in its entirety. The present disclosure claims priority to Chinese Patent Application No. 202010231552.9, filed with the Chinese Patent Office on Mar. 27, 2020 and entitled "SHELF AND WAREHOUSING APPARATUS," which is incorporated herein by reference in its entirety. The present disclosure claims priority to Chinese Patent Application No, 202021892576.0, filed with the Chinese Patent Office on Sep. 2, 2020 with the utility model name "SHELF AND WAREHOUSING APPARATUS," which is incorporated herein by reference in its entirety. The present disclosure claims priority to Chinese Patent Application No. 202010231545.9, filed with the Chinese Patent Office on Mar. 27, 2020 and entitled "WAREHOUSING APPARATUS, SYSTEM, AND CONTROL METHOD," which is incorporated herein by reference in its entirety. The present disclosure claims priority to Chinese Patent Application No, 202010232310.1, filed with the Chinese Patent Office on Mar. 27, 2020 and entitled "IN-WAREHOUSE AND EX-WAREHOUSE CONTROL METHODS AND APPARATUSES, DEVICE, AND READABLE STORAGE MEDIUM," which is incorporated herein by reference in its entirety. In addition, the present disclosure claims priority to Chinese Patent Application No. 202022292766.5, filed with the Chinese Patent Office on Oct. 15, 2020 with the utility model name "DOCKING PLATFORM AND WORKSTATION," which is incorporated herein by reference in its entirety.

TECHNICAL FIELD

The present disclosure relates to the field of warehousing technologies, and in particular, to a warehousing apparatus, system, and a control method.

BACKGROUND

The existing warehousing industry mostly uses robots integrated with automatic climbing and moving capabilities to access and transfer cargoes. However, because there are too many storage actions for the robots in accessing the cargoes, this leads to low efficiency for in-warehouse and ex-warehouse of the cargoes.

SUMMARY

The embodiments of the present disclosure provide a warehousing apparatus, system, and a control method to solve or alleviate one or more technical problems in the related art.

In order to achieve the above purpose, the present disclosure adopts the following technical solutions:

As a first aspect of the embodiments of the present disclosure, an embodiment of the present disclosure provides a warehousing apparatus, including:

a plurality of shelves, where each of the shelves includes at least one temporary storage layer board, at least one storage layer board, and a plurality of columns spaced apart in a horizontal direction, and the storage layer board is arranged spaced above or below the temporary storage layer board in a vertical direction between the columns, where the temporary storage layer board is used to provide a plurality of temporary storage positions, and the storage layer board is used to provide a plurality of storage positions;

a first robot channel for a first robot to drive, where the first robot is used to access cargo on the temporary storage layer board: and a second robot channel for a second robot to drive, where the second robot is used to transfer the cargo between the temporary storage layer board and the storage layer board.

As a second aspect of the embodiments of the present disclosure, an embodiment of the present disclosure provides an in-warehouse control method, including:

determining a target temporary storage position according to a target storage position of a target cargo;

instructing a first robot to transfer the target cargo to the target temporary storage position; and when a warehousing apparatus receives a transfer completion signal sent by the first robot, instructing a second robot to transfer the target cargo from the target temporary storage position to the target storage position.

As a third aspect of the embodiments of the present disclosure, an embodiment of the present disclosure provides an ex-warehouse control method, including:

instructing a second robot to transfer a target cargo away from a current storage position;

determining a target temporary storage position according to a position of the second robot;

instructing the second robot to transfer the target cargo to the target temporary storage position; and when a warehousing apparatus receives a transfer completion signal sent by the second robot, instructing the first robot to transfer the target cargo away from the target temporary storage position.

As a fourth aspect of the embodiments of the present disclosure, an embodiment of the present disclosure provides a warehousing system, including:

the warehousing apparatus of any one of the foregoing implementations;

a control device, including a processor and a memory, where the memory stores instructions, and the instructions, when being loaded and executed by the processor, implement the method of any one of the foregoing implementations;

a first robot, driving on a first robot channel; and a second robot, driving on a second robot channel.

One of the foregoing technical solutions has the following advantages or beneficial effects: the first robot directly accesses the cargoes on the temporary storage layer board, which avoids the operation of extending the robot arm to a shelf layer board, and improve the efficiency of accessing cargoes; in addition, the temporary storage layer board may temporarily store the cargoes, and the storage positions provided by the storage layer board may store the cargoes for a long time, which is convenient to cooperate the temporary storage layer board with the storage layer board to improve the ex-warehouse and in-warehouse efficiency of the cargoes; furthermore, the first robot channel and the second robot channel are respectively formed, which can avoid the first robot and the second robot sharing a same driving channel, improve the driving efficiency of the first robot and the second robot, and then improve the ex-warehouse and in-warehouse efficiency.

BRIEF DESCRIPTION OF TILE DRAWINGS

To describe the technical solutions in the embodiments of the present disclosure or the related art more clearly, the following briefly describes the accompanying drawings required for describing the embodiments or the related art. Apparently, the accompanying drawings in the following description are merely some embodiments described in the embodiments of the present disclosure, and a person of ordinary skill in the art may still derive other drawings from these accompanying drawings.

DETAILED DESCRIPTION

Only some exemplary embodiments are briefly described below. As a person skilled in the art may realize, the described embodiments may be modified in various different ways without departing from the spirit or scope of the present disclosure. Therefore, the drawings and description are regarded as illustrative and not restrictive in nature.

Embodiment 1

Figure 1:
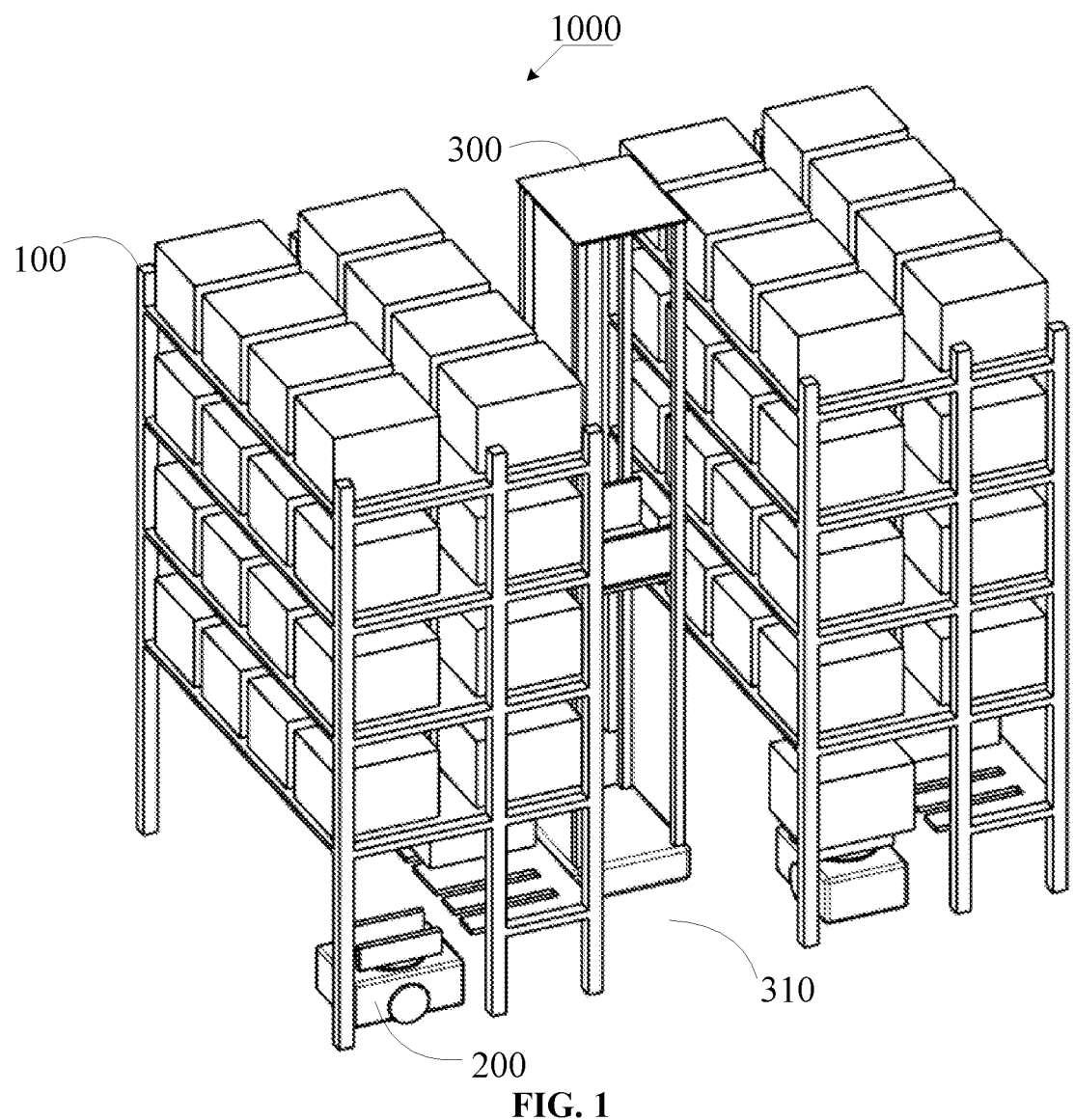
FIG. 1 shows a three-dimensional schematic structural diagram of a warehousing apparatus according to Embodiment 1 of the present disclosure.
Figure 2:
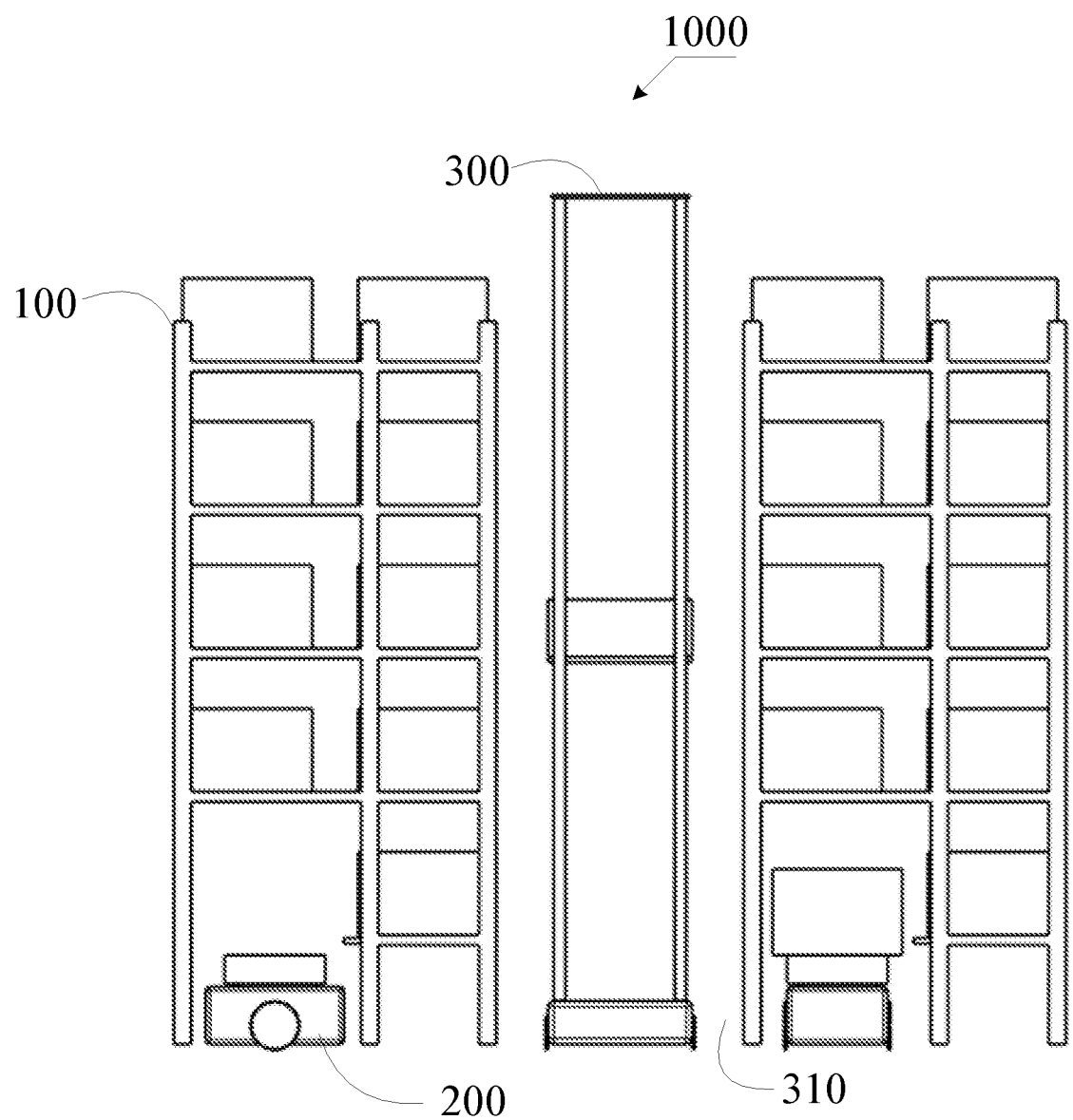
FIG. 2 shows a schematic side view of a warehousing apparatus according to Embodiment 1 of the present disclosure.
Figure 3:
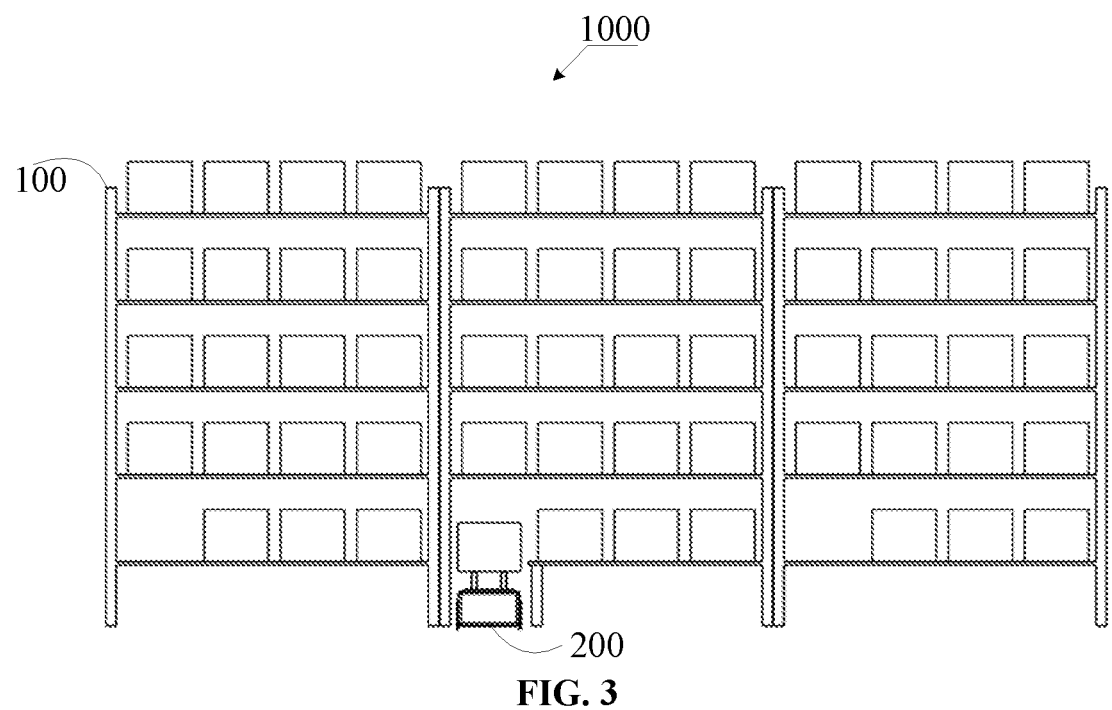
FIG. 3 shows a schematic structural diagram of a warehousing apparatus according to Embodiment 2 of the present disclosure.

FIG. 1 shows a three-dimensional schematic structural diagram of a warehousing apparatus according to an embodiment of the present disclosure.

As shown in FIG. 1 to FIG. 4, the warehousing apparatus 1000 may include at least one temporary storage layer board 120, where the temporary storage layer board 120 is used to provide at least one temporary storage position; a plurality of shelves 100, where each of the shelves 100 may include at least one storage layer board 130 and a plurality of columns 110 arranged at an interval in a horizontal direction, and the storage layer board 130 is used to provide at least one storage position. The temporary storage layer board 120 is provided with furcal grooves 121, and each of the furcal grooves 121 is used to cooperate with a furcal arm 210 of the first robot 200; and the storage layer board 130 is arranged at an interval with the temporary storage layer board 120 in a vertical direction between the columns 110.

In an example, the plurality of shelves 100 may be single-row shelves, double-row shelves or multi-row shelves; the number of the plurality of shelves 100 include two or more; and the plurality of shelves 100 may be arranged in columns (refer to FIG. 1 and FIG. 2), in rows (refer to FIG. 3), or in a matrix. The number of rows of, the number of, and the arrangement manner of the plurality of shelves 100 may be selected and adjusted according to actual needs, and both the number of and the arrangement manner of the plurality of shelves 100 are not limited in the embodiment of the present disclosure.

In an example, the plurality of columns 110 may enclose a rectangular area in which the temporary storage layer board 120 and the storage layer board 130 are installed, so that the temporary storage layer board 120 and the storage layer board 130 are arranged at an interval in the vertical direction between the columns 110. However, arrangement positions of the columns 110 are not limited in this embodiment, as long as the temporary storage layer board 120 and the storage layer board 130 are arranged at an interval in the vertical direction. For example, the columns 110 may also pass through the middle of the temporary storage layer board 120 and the storage layer board 130 in the vertical direction, instead of an edge thereof.

For ease of description, in the following embodiment, a long side of the temporary storage layer board 120 is set as a side of the temporary storage layer board 120, and a short side of the temporary storage layer board 120 is set as an end of the temporary storage layer board 120.

In an example, a plurality of temporary storage positions provided on the temporary storage layer board 120 includes two or more temporary storage positions; a furcal groove 121 is arranged under each temporary storage position, and the shape of the furcal groove 121 may be U-shaped, C-shaped, I-shaped, V-shaped, or the like. The shape of the furcal groove 121 may be selected and adjusted according to actual needs, as long as it can cooperate with the furcal arm 210 of the first robot 200, and the shape of the furcal groove 121 is not limited in the present disclosure.

The temporary storage layer board 120 may be located on any layer of the shelf 100, and the position of the temporary storage layer board 120 is not limited in the embodiment of the present disclosure. If the temporary storage layer board 120 is located in a middle layer of the shelf 100, the storage layer boards 130 are located above and below the temporary storage layer board 120, which may shorten distances between the temporary storage layer board 120 and the storage layer boards 130, and improve the transfer efficiency of the cargoes between the temporary storage layer board 120 and the storage layer boards 130. The cargoes may be boxes containing materials, products, and the like. The boxes may be cardboard boxes or material boxes, and the type of the boxes and the articles contained therein are not limited in the present disclosure.

In an example, the width of the temporary storage layer board 120 is less than half of the width of the storage layer board 130. For example, the shelf 100 may be a double-row shelf, the temporary storage layer board 120 may be one row of the double-row shelf. The storage layer board 130 extends from one row shelf of the double-row shelf to another row shelf of the double-rosy shelf in the horizontal direction, and the width of the temporary storage layer board 120 is set to be less than half of the width of the storage layer board 130. Since a width channel of the cargoes is greater than the width of the first robot 200, the width of the temporary storage layer board 120 is set to be less than half of the width of the storage layer board 130. The width of a first driving channel 141 may be greater than the width of the storage layer board 130 to provide a channel wide enough for the first robot 200 to transfer cargoes. Because the width of the storage layer board 130 is greater than twice width of the temporary storage layer board 120, the storage layer board 130 may store a cargo whose size is slightly larger than that of the temporary storage position.

Figure 9:
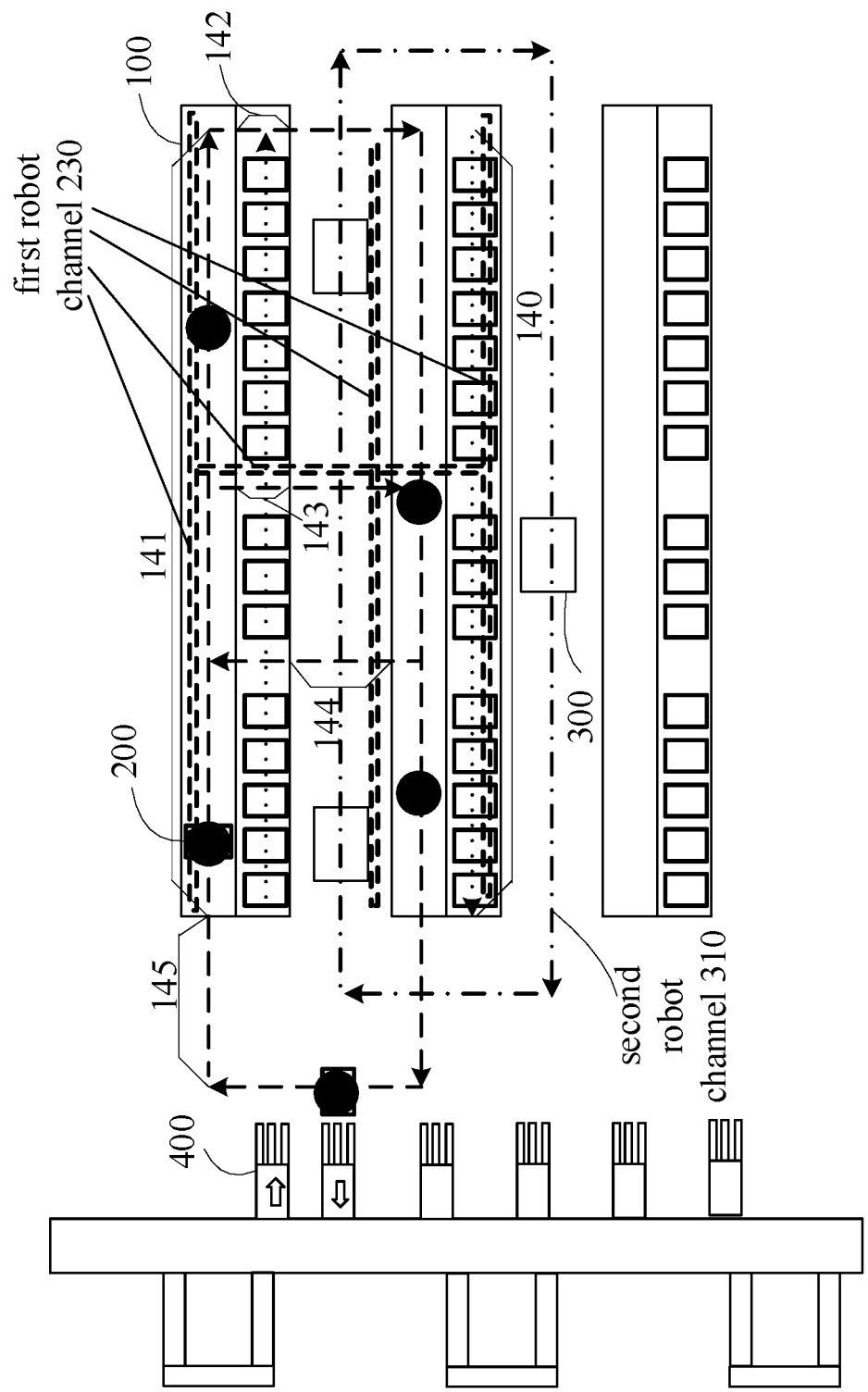
FIG. 9 shows a schematic diagram of an application scenario according to an embodiment of the present disclosure.

The warehousing apparatus 1000, as shown in FIG. 9, may include: a first robot channel 230 for the first robot 200 to drive, where the first robot 200 is used to cooperate with the furcal groove 121 through the furcal arm 210 thereof to access the cargoes on the temporary storage layer board 120; and a second robot channel 310 for the second robot 300 to drive, where the second robot 300 is used to transfer cargoes between the temporary storage layer board 120 and the storage layer board 130.

In an example, the first robot channel 230 may be defined by the structure of the shelf 100, or may be located on a side outside the shelf 100. The second robot channel 310 may be located on another side outside the shelf 100, so as to separate the first robot channel 230 from the second robot channel 310 to avoid channel occupation.

Figure 6:
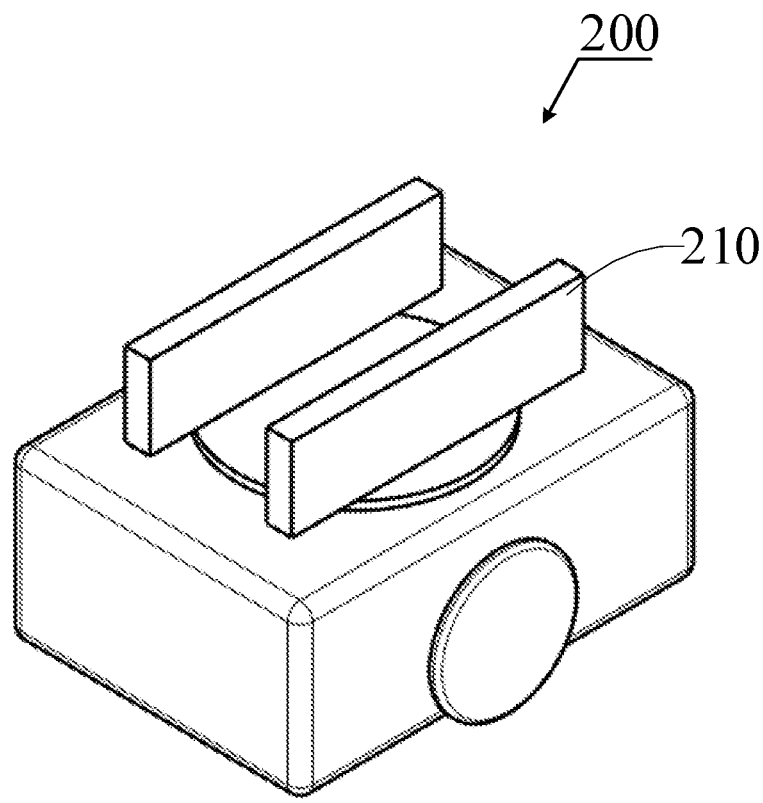
FIG. 6 shows a schematic structural diagram of a first robot according to Embodiment 1 of the present disclosure.
Figure 7:
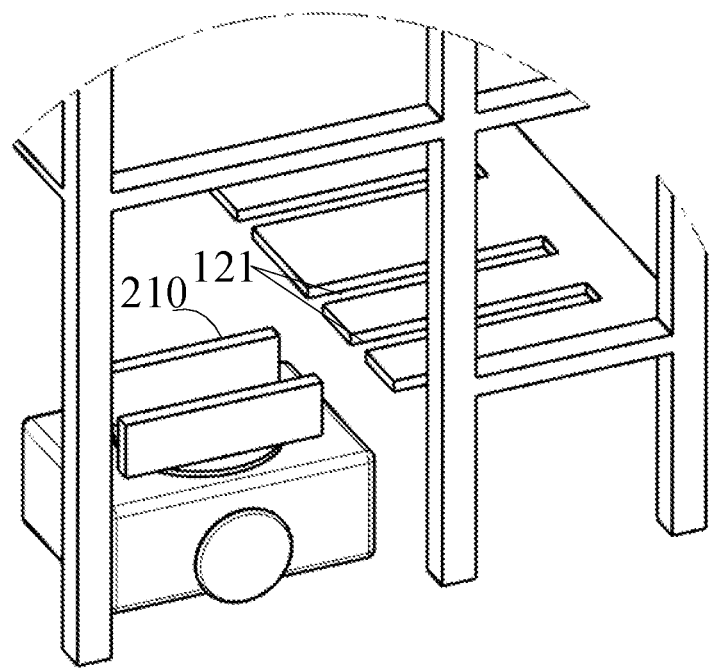
FIG. 7 shows a schematic diagram of cooperation between a furcal arm of a first robot and a furcal groove of a shelf according to Embodiment 1 of the present disclosure.

As shown in FIG. 6 and FIG. 7, the first robot 200 may be an AGV (Automated Guided Vehicle, AGV for short) vehicle with the furcal arm 210, and the furcal arm 210 thereof may be arranged on the top of the first robot 200, and may also be arranged on the side of the first robot 200. The arrangement manner of the furcal arm 210 of the first robot 200 is not limited in the embodiment of the present disclosure.

Figure 8:
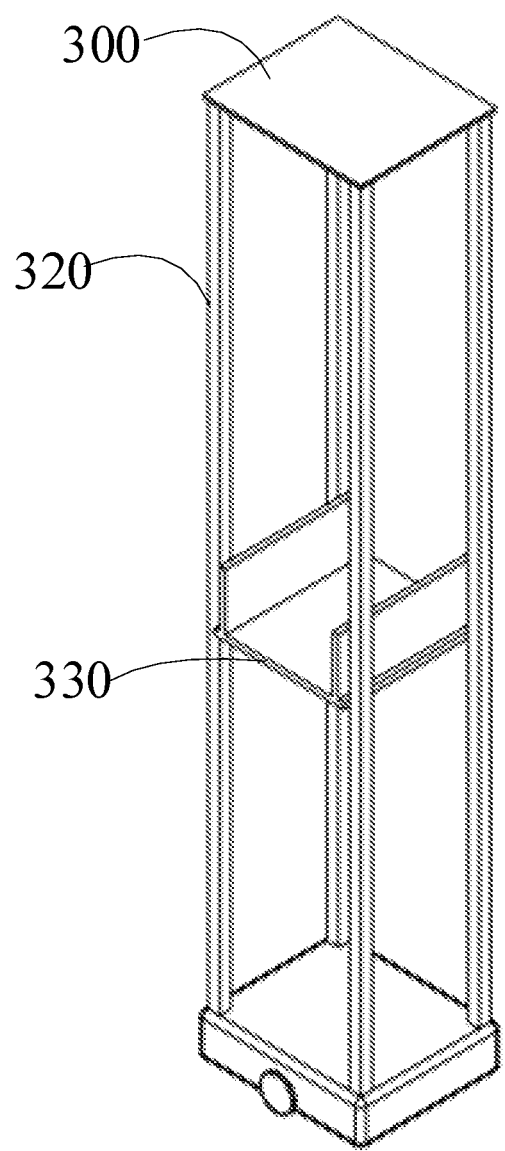
FIG. 8 shows a schematic structural diagram of a second robot according to Embodiment 1 of the present disclosure.

As shown in FIG. 8, the second robot 300 may be the AGV vehicle with a lifting mechanism 320 and an access mechanism 330, or may also be a stacking machine, or the like. The type of the second robot 300 is not limited in the embodiment of the present disclosure, as long as it has the functions of accessing and transferring cargoes. According to the warehousing apparatus 1000 of the embodiment of the present disclosure, since the temporary storage layer board 120 provides the furcal groove 121 for cooperating with the furcal arm 210 of the first robot 200, the furcal arm 210 of the first robot 200 may be directly inserted into the furcal groove 121 of the temporary storage layer board 120. Therefore, the first robot 200 may directly access the cargoes on the temporary storage layer board 120, which avoids the operation of extending the robot arm to the shelf 100, and improves the efficiency of accessing cargoes. In addition, the temporary storage layer board 120 may temporarily store the cargoes, and the storage positions provided by the storage layer board 130 may store the cargoes for a long time, which is convenient to cooperate the temporary storage layer board 120 with the storage layer board 130 to improve the ex-warehouse and in-warehouse efficiency of the cargoes. Furthermore, the first robot channel 230 and the second robot channel 310 are respectively formed, which can further avoid the first robot 200 and the second robot 300 sharing a same driving channel, improve the driving efficiency of the first robot 200 and the second robot 300, and then improve the ex-warehouse and in-warehouse efficiency.

In an implementation, the first robot channel 230 may include a cargo access channel 140, and the cargo access channel 140 is located below the temporary storage layer board 120. When the first robot 200 is in the cargo access channel 140, the furcal groove 121 cooperates with the furcal arm 210 on the first robot 200 to access the cargoes.

Figure 4:
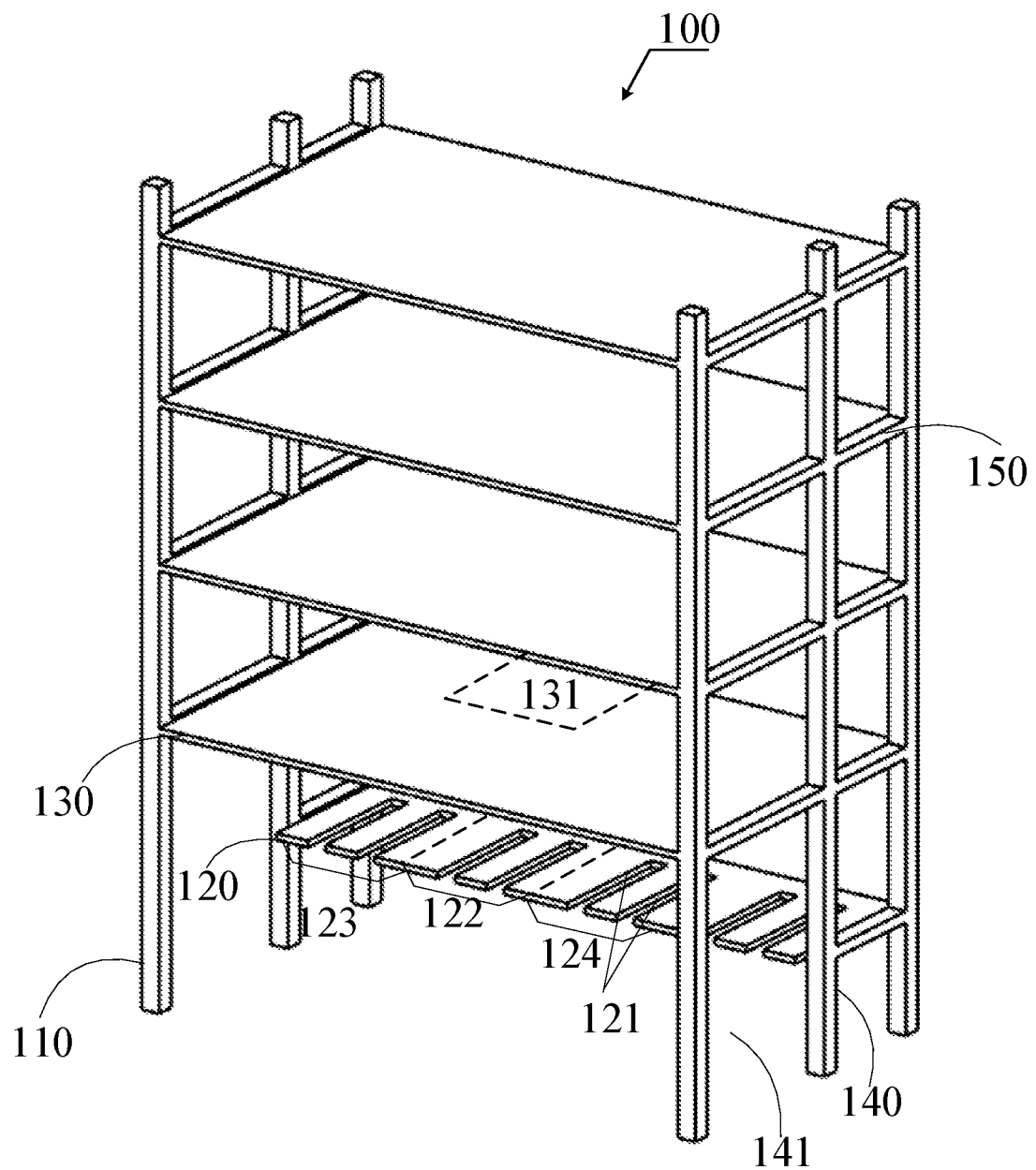
FIG. 4 shows a schematic structural diagram of a shelf according to Embodiment 1 of the present disclosure.

In an example, as shown in FIG. 4 and FIG. 7, in a case of storing the cargoes, the first robot 200 aligns the furcal arm 210 with the furcal groove 121 at the side of the furcal groove of the temporary storage layer board 120 and drives to the cargo access channel 140, so that the furcal arm 210 directly protrudes into the furcal groove 121, and the cargoes are placed on the temporary storage layer board 120, and then the furcal arm 210 is lowered so that the cargo box is left on the temporary storage layer board 120. In a case of picking up cargoes, the first robot 200 drives below the cargo access channel 140, aligns the furcal arm 210 with the furcal groove 121 below the temporary storage layer board 120 and lifts the furcal arm 210 to jack up the cargo box, and then drives in a direction away from the side of the furcal groove of the temporary storage layer board 120 to leave the cargo access channel 140 to take the cargo box. In this way, the first robot 200 may directly pick up the cargoes without stopping driving or stopping driving for a short time, eliminating the operation of controlling the robot arm to extend to the layer board, which may improve the efficiency of accessing the cargo box, and accessing and obtaining is performed below the temporary storage layer board 120, which may effectively utilize the space of the shelf 100.

In an implementation, the cargo access channel may further be used for the first robot to drive when the first robot is unloaded.

In an example, when the first robot 200 is unloaded (namely, the first robot 200 is not loaded with cargoes), the first robot 200 may directly drive in the cargo access channel 140, which may improve the transfer efficiency of the cargoes.

In an implementation, as shown in FIG. 4, the columns 110 are arranged on the outer periphery of the storage layer board 130. The first robot channel 230 includes a first driving channel 141. The first driving channel 141 is located between the temporary storage layer board 120 and the columns 110 located on the side of the furcal groove of the temporary storage layer board 120.

In an example, if the temporary storage layer board 120 is located at the bottom layer of the columns 110, the temporary storage layer board 120, the columns 110 located on the side of the furcal groove of the temporary storage layer board 120, and the ground may form a first driving channel 141 for the first robot 200 to drive.

In an example, if the temporary storage layer board 120 is located at other layers other than the bottom layer of the columns 110, a first driving channel 141 for the first robot 200 to drive may be formed by: the temporary storage layer board 120, the columns 110 located on the side of the furcal groove of the temporary storage layer board 120, and a storage layer board 130 located on a layer below and next to the layer where the temporary storage layer board 120 is located.

In this implementation, the first driving channel 141 for the first robot 200 to drive is formed between the temporary storage layer board 120 and the columns 110 located on the side of the furcal groove of the temporary storage layer board 120, so that the first robot 200 may drive in any layer of the shelf 100, which is convenient for the first robot 200 to cooperate with the temporary storage layer board 120 and avoids occupying a channel outside the shelf 100.

Figure 5:
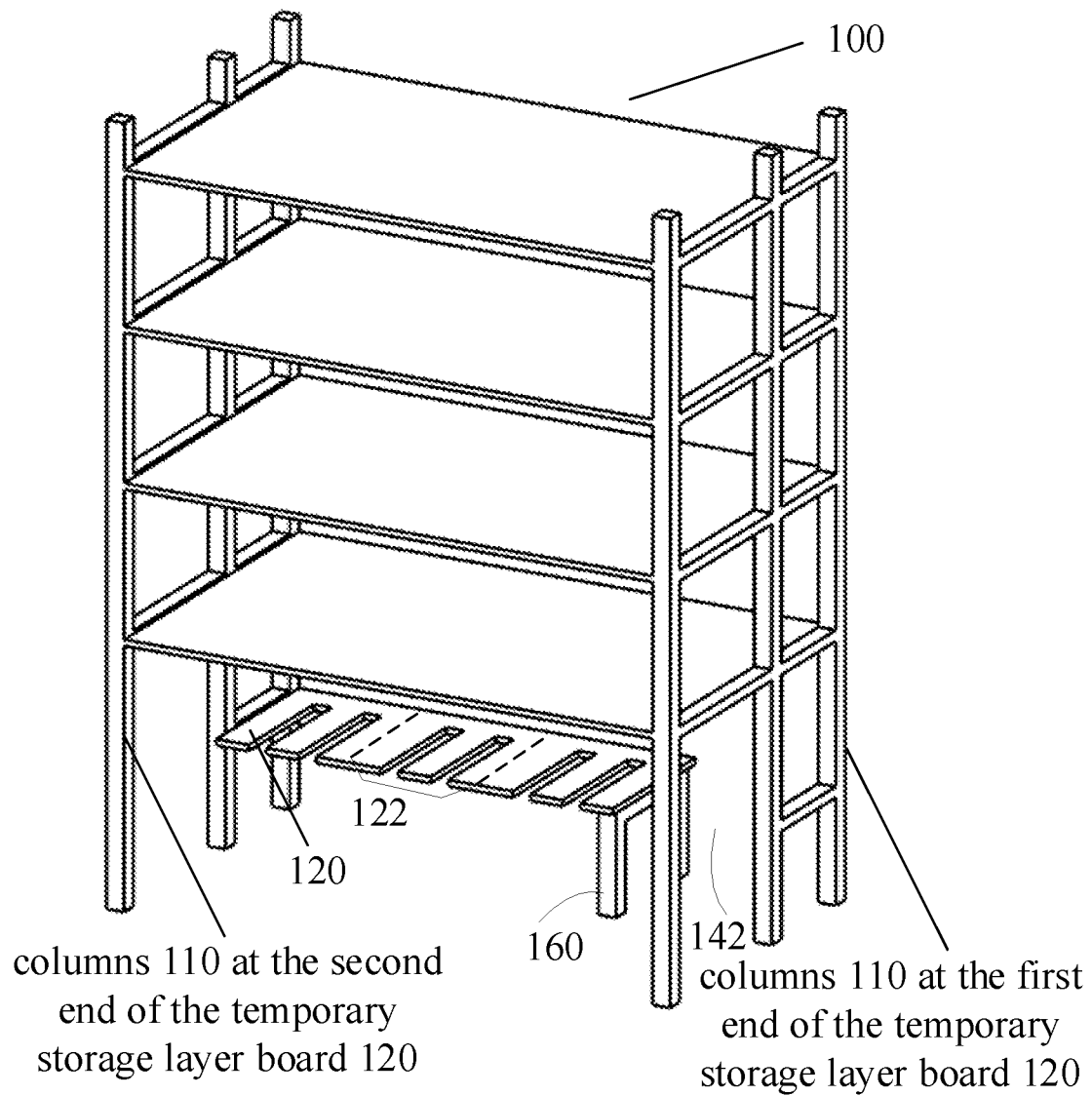
FIG. 5 shows a schematic structural diagram of a shelf according to Embodiment 1 of the present disclosure.

In an example, as shown in FIG. 4, the shelf 100 may further include: cross beams 150, where each of the cross beams 150 is arranged in a horizontal direction and is used for fixing short sides of the temporary storage layer board 120 and the storage layer board 130 on the columns 110, 10078j FIG. 5 shows a schematic structural diagram of a shelf 100 according to another embodiment of the present disclosure. The structure of the shelf 100 is similar to the structure of the shelf 100 in FIG. 1, the difference is that, as shown in FIG. 5, a second driving channel 142 for the first robot 200 to drive is formed between the temporary storage layer board 120 and the columns 110 located at the first end of the temporary storage layer board 120. In this way, the first robot 200 may pass through the shelf 100 in the second driving channel 142, so that a driving distance of the first robot 200 may be shortened, and transfer efficiency of cargo boxes may be improved.

In an example, the shelf 100 may further include: a support column 160 arranged at the first end of the temporary storage layer board 120 for support.

In an implementation, as shown in FIG. 1 to FIG. 4, the temporary storage layer board 120 includes a plurality of temporary storage boards, each of the temporary storage boards is provided with a furcal groove 121, and a third driving channel (refer to 143 in FIG. 9) for the first robot 200 to drive is formed between at least two temporary storage boards. In this way, the first robot 200 may pass through the shelf 100 between any two temporary storage boards of the temporary storage layer board 120, so that a driving distance of the first robot 200 may be shortened, and transfer efficiency of cargo boxes may be improved.

In this embodiment, as shown in FIG. 9, the second robot channel 310 is formed between adjacent shelves 100, so that the second robot 300 may drive in the second robot channel 310, so as to transfer cargoes between the temporary storage layer board 120 and the storage layer board 130. The cargoes temporarily stored in the temporary storage layer board 120 are transferred to the storage layer board 130 for in-warehouse storage, or the cargoes stored in the storage layer board 130 are transferred to the temporary storage layer board 120 for the ex-warehouse temporary storage, which may improve the access efficiency and the ex-warehouse and in-warehouse efficiency of the cargoes. In addition, the second robot channel 310 does not coincide with the driving channel of the first robot 200, which may avoid the first robot 200 and the second robot 300 sharing a same driving channel, improve the cooperation efficiency of the first robot 200 and the second robot 300, and then improve the ex-warehouse and in-warehouse efficiency.

It should be noted that, in the warehousing apparatus 1000, the second robot 300 integrated with a lifting mechanism 320 and an access mechanism 330 is generally used to transfer and access cargoes. However, because the cost of the second robot 300 is relatively high, and there are relatively long distances between a docking port 400 for the cargoes and each temporary storage position and each storage position in the shelf 100, the ex-warehouse and in-warehouse costs of the cargoes per unit time are relatively high, and the efficiency is relatively low. By forming the second robot channel 310 between adjacent shelves 100, the warehousing apparatus 1000 of the embodiment of the present disclosure may be configured with the second robot 300 to transfer cargoes between the temporary storage layer board 120 and the storage layer board 130. The warehousing apparatus 1000 of the embodiment of the present disclosure may be configured with the first robot 200 to transfer and access the cargoes on the temporary storage layer board 120. The first robot 200 may not have a lifting mechanism, and the cost thereof is much lower than that of the second robot 300. In this way, one second robot 300 may be equipped with a plurality of first robots 200 for coordinating access of cargoes, which may reduce the ex-warehouse and in-warehouse costs of the cargoes per unit time and may improve the ex-warehouse and in-warehouse efficiency of the cargoes.

In an application scenario, the first robot 200 may be a robot that accesses and transfers one box of cargoes once, and the second robot 300 may be a robot that accesses and transfers a plurality of boxes of cargoes once. The second robot 300 is configured to transfer cargoes between the temporary storage layer board 120 and the storage layer board 130. The first robot 200 is configured to transfer and access cargoes on the temporary storage layer board 120, Therefore, the ex-warehouse and in-warehouse costs of the cargoes per unit time may be reduced and the ex-warehouse and in-warehouse efficiency of the cargoes may be improved.

In an implementation, as shown in FIG. 4 and FIG. 9, the temporary storage layer board 120 includes a plurality of temporary storage boards 122, and each of the temporary storage boards 122 is provided with a furcal groove 121. The first robot channel 230 includes a third driving channel 143, and the third driving channel 143 is located between at least two temporary storage boards 122. A width of the third driving channel 143 may be one, two, three, or more times the width of the temporary storage board 122, which is not limited in the present disclosure. For example, some of the temporary storage boards 122 may be removed to form the third driving channel 143. In this way, the first robot 200 may pass through the shelf in the third driving channel 143 to improve the driving efficiency.

In an implementation, as shown in FIG. 9, the first robot channel 230 includes a fourth driving channel 144. The fourth driving channel 144 is located between two adjacent shelves 100. The fourth driving channel 144 connects two third driving channels 143 or two second driving channels 142. In this way, the first robot 200 may pass through the shelf 100 via, the third driving channel 143 and then drives along the fourth driving channel 144 to an adjacent shelf 100, thereby shortening a driving distance of the first robot 200 and improving the transfer efficiency of the cargoes.

In an implementation, the warehousing apparatus 1000 further includes a docking platform 400 (the docking platform 400 may also be referred to as a docking port). A second driving channel 142 for the first robot 200 to drive is formed between the temporary storage layer board 120 and the columns 110 at the first end of the temporary storage layer board 120, and a fifth driving channel 145 for the first robot 200 to drive is formed between the docking platform 400 and the shelf 100, as shown in FIGS. 4, 5, and 9. For example, a fifth driving channel 145 for the first robot 200 to drive is formed between the docking platform 400 and the columns 110 located at the second end of the temporary storage layer board 120, as shown in FIGS. 4, 5, and 9. In this way, the first robot 200 may directly drive from the docking platform 400 to the first driving channel 141 of the first robot 200 in the shelf 100 along the fifth driving channel 145, and can quickly reach the temporary storage layer board 120, thereby improving the cooperation efficiency.

In mm example, the fifth driving channel 145, the first driving channel 141, the second driving channel 142, the third driving channel 143, and the fourth driving channel 144 may form a first driving loop for the first robot 200 to drive (a line segment loop with arrows in FIG. 9).

In an example, the cargo access channel 140 below the temporary storage layer board 120 may form a second driving loop (a dashed line with arrows in FIG. 9) for the first robot 200 to drive, so that the first robot 200 drives in a case of being unloaded.

In an example, the second robot channel 310 of the second robot 300 may form a loop (a dotted line with arrows in FIG. 9) for the second robot 300 to drive.

By arranging the first driving loop, the second driving loop, and the loop for the second robot 300 to drive in the foregoing examples, the first robot 200 and the second robot 300 may be prevented from occupying each other's driving channel, thereby improving the cooperation efficiency between the two. In this way, a plurality of first robots 200 and a plurality of second robots 300 may be arranged to implement the ex-warehouse and in-warehouse of the cargoes and improve the ex-warehouse and in-warehouse efficiency.

Other components of the warehousing apparatus 1000 in the foregoing embodiment may adopt various technical solutions known to those of ordinary skill in the art now and in the future, which will not be described in detail herein.

Embodiment 2

Figure 10:
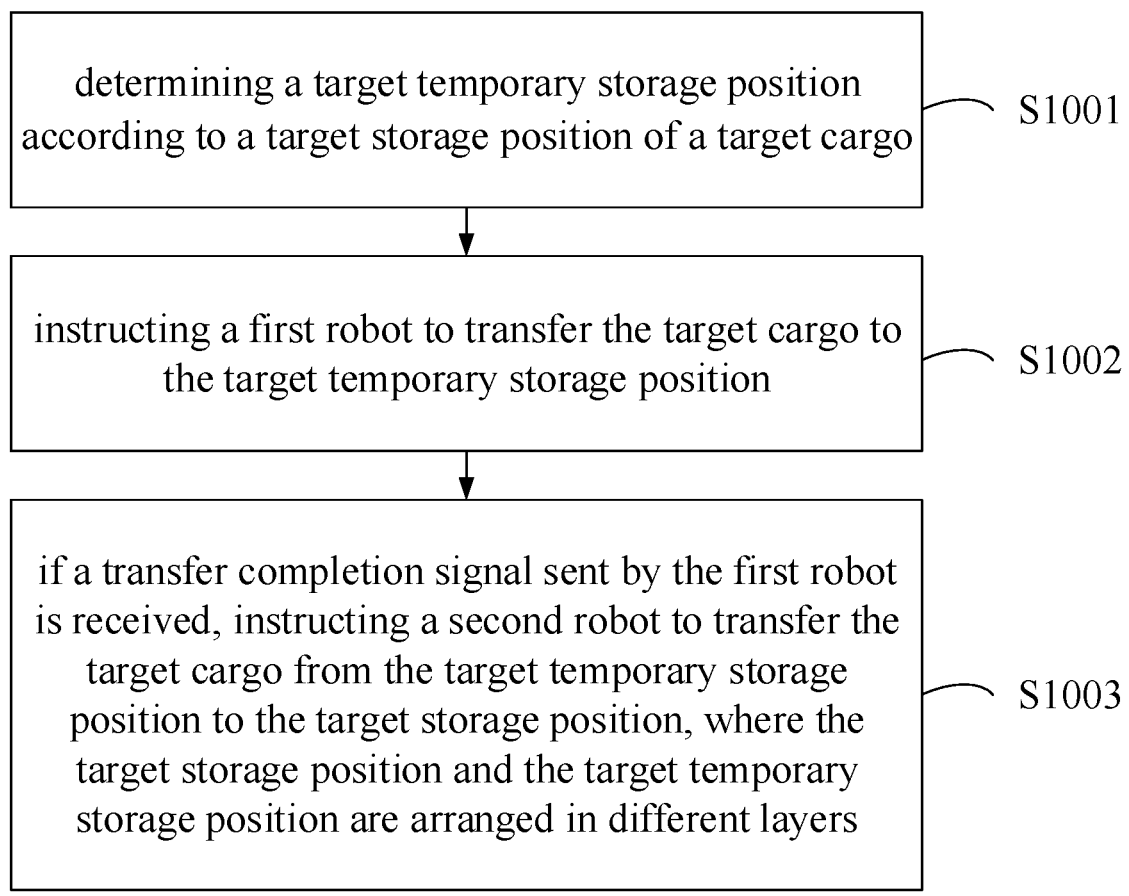
FIG. 10 shows a schematic flowchart of an in-warehouse control method according to Embodiment 2 of the present disclosure.

FIG. 10 shows a schematic flowchart of an in-warehouse control method according to Embodiment 2 of the present disclosure. The in-warehouse control method is suitable for the warehousing apparatus applied to Embodiment 1 mentioned above. As shown in FIG. 10, the in-warehouse control method may include:

S1001: determining a target temporary storage position according to a target storage position of a target cargo;

S1002: instructing a first robot to transfer the target cargo to the target temporary storage position; and S1003: when a warehousing apparatus receives a transfer completion signal sent by the first robot, instructing a second robot to transfer the target cargo from the target temporary storage position to the target storage position, where the target storage position and the target temporary storage position are arranged in different layers.

As shown in FIG. 4, the temporary storage position may be arranged on the temporary storage layer board 120 of the shelf 100, the storage position may be arranged on the storage layer board 130 of the shelf, and the temporary storage position and the storage position may be arranged on different layers in the same shelf 100, or may also be arranged on different layers of adjacent shelves. The temporary storage position and the storage position may be adjusted and selected according to actual needs, and the arrangement manner of the temporary storage position and the storage position is not limited in the embodiment of the present disclosure.

The target storage position of the target cargo may be determined according to the type of the target cargo. For example, if the type of the target cargo is the type of the most popular cargo, a storage position with the shortest transfer consuming time may be allocated for the target cargo from the shelf as the target storage position. For example, when the temporary storage position is arranged on the bottom layer of the shelf, a storage position closest to the docking platform and located at a layer above the layer where the temporary storage position is located is the storage position with the shortest transfer consuming-time. In this way, a corresponding consuming-time storage position may be determined as the target storage position according to a popular degree of the target cargo.

In an example, since the target temporary storage position may temporarily store the target cargo, the second robot may be immediately instructed to transfer the target cargo from the target temporary storage position to the target storage position when a warehousing apparatus receives the transfer completion signal sent by the first robot, or the second robot may be instructed to transfer the target cargo from the target temporary storage position to the target storage position after the second robot has completed other operations. In this way, the first robot and the second robot may use the temporary storage position to independently transfer the target cargo, and the first robot and the second robot can drive high-efficiently with no need to directly cooperate to transfer the target cargo, which improves the in-warehouse efficiency of the cargoes.

In an example, according to the in-warehouse control method, the target temporary storage positions may be determined for the target storage positions of the plurality of target cargoes respectively, and the plurality of first robots are instructed to transfer the plurality of target cargoes to the corresponding target temporary storage positions respectively. When the warehousing apparatus receives the transfer completion signals sent by the plurality of first robots, the warehousing apparatus instructs the second robot to transfer the plurality of target cargoes from the corresponding target temporary storage positions to the corresponding target storage positions respectively.

According to the in-warehouse control method of the embodiment of the present disclosure, the target temporary storage position is determined based on the target storage position of the target cargo. The first robot is instructed to transfer the target cargo to the target temporary storage position for temporary storage and the second robot is instructed to transfer the target cargo from the target temporary storage position to the target storage position respectively. Therefore, the ground transfer of the target cargo is separated from the transfer of the target cargo between the temporary storage position and the storage position. Therefore, the first robot may independently complete the ground transfer of the target cargo, and the second robot may independently complete transfer of the target cargo between the temporary storage position and the storage position. There is no need for the first robot and the second robot to directly dock the target cargo, which avoids a phenomenon that the first robot and the second robot wait for each other, and helps improve the in-warehouse efficiency of the cargoes.

In an application scenario, the first robot may be a robot that accesses and transfers one box of cargoes once, which drives faster and costs less. The second robot may be a robot that accesses and transfers a plurality of boxes of cargoes once, which drives slower and costs more. If the first robot is directly instructed to transfer the target cargo from the docking platform to the target storage position, and/or the second robot is instructed to transfer the target cargo from the docking platform to the target storage position, both the first robot and the second robot may have lower transfer efficiency and higher transfer costs due to long transfer distances. However, according to the in-warehouse control method of the embodiment of the present disclosure, the first robot may transfer cargoes between the docking platform and the temporary storage position, and the second robot may transfer cargoes between the temporary storage position and the storage position. This is beneficial to shorten the driving distances of the first robot and the second robot, so as to improve the in-warehouse efficiency of the cargoes through high-efficient cooperation of the first robot and the second robot.

Figure 11:
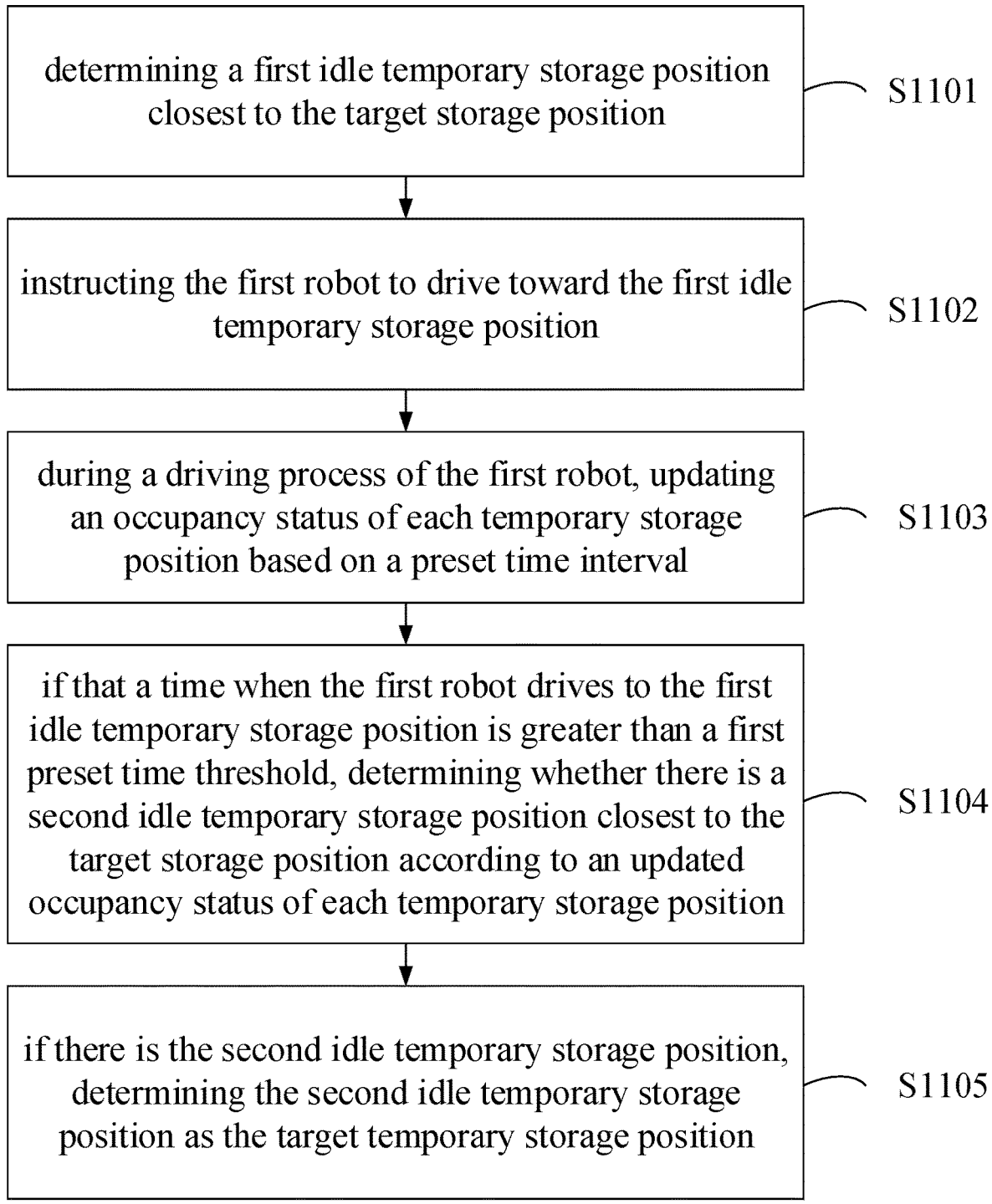
FIG. 11 shows a schematic flowchart of the operation S1001 in FIG. 10.

For example, as shown in FIG. 11, the operation S1001: the determining the target temporary storage position according to the target storage position of the target cargo, may include:

S1101: determining a first idle temporary storage position closest to the target storage position; herein, the first idle temporary storage position is a temporary storage position that is in an idle state;

S1102: instructing the first robot to drive toward the first idle temporary storage position;

S1103: during a driving process of the first robot, updating an occupancy status of each of temporary storage positions based on a preset time interval;

S1104: when a time that the first robot drives to the first idle temporary storage position is greater than a first preset time threshold, determining whether there is a second idle temporary storage position closer to the target storage position according to an updated occupancy status of each of the temporary storage positions; and S1105: when there is the second idle temporary storage position closer to the target storage position, determining the second idle temporary storage position as the target temporary storage position.

In an example, as shown in FIG. 4, when the temporary storage position provided by the temporary storage board 122 under the target storage position provided by the storage board 131 is in an occupied state, it may be determined that the temporary storage position provided by the temporary storage board 123 or the temporary storage position provided by the temporary storage board 124 in an adjacent column of the target storage board 131 is the first idle temporary storage position. The first robot is instructed to drive towards the first idle temporary storage position. If the temporary storage position provided by the temporary storage board 122 is updated to an idle state during the driving process of the first robot, and a time for the first robot to drive to the first idle temporary storage position is greater than the first preset time threshold, it is determined that the temporary storage position provided by the temporary storage position 122 is the second idle temporary storage position. The second idle temporary storage position is set to the target temporary storage position. In this way, the target temporary storage position may be dynamically adjusted during the driving process of the first robot. Therefore, the transfer distance between the target temporary storage position and the target storage position is less than the transfer distance between the first idle temporary storage position and the target temporary storage position. Therefore, the transfer distance of the target cargo may be reduced and the in-warehouse efficiency of the cargo may be improved.

Figure 12:
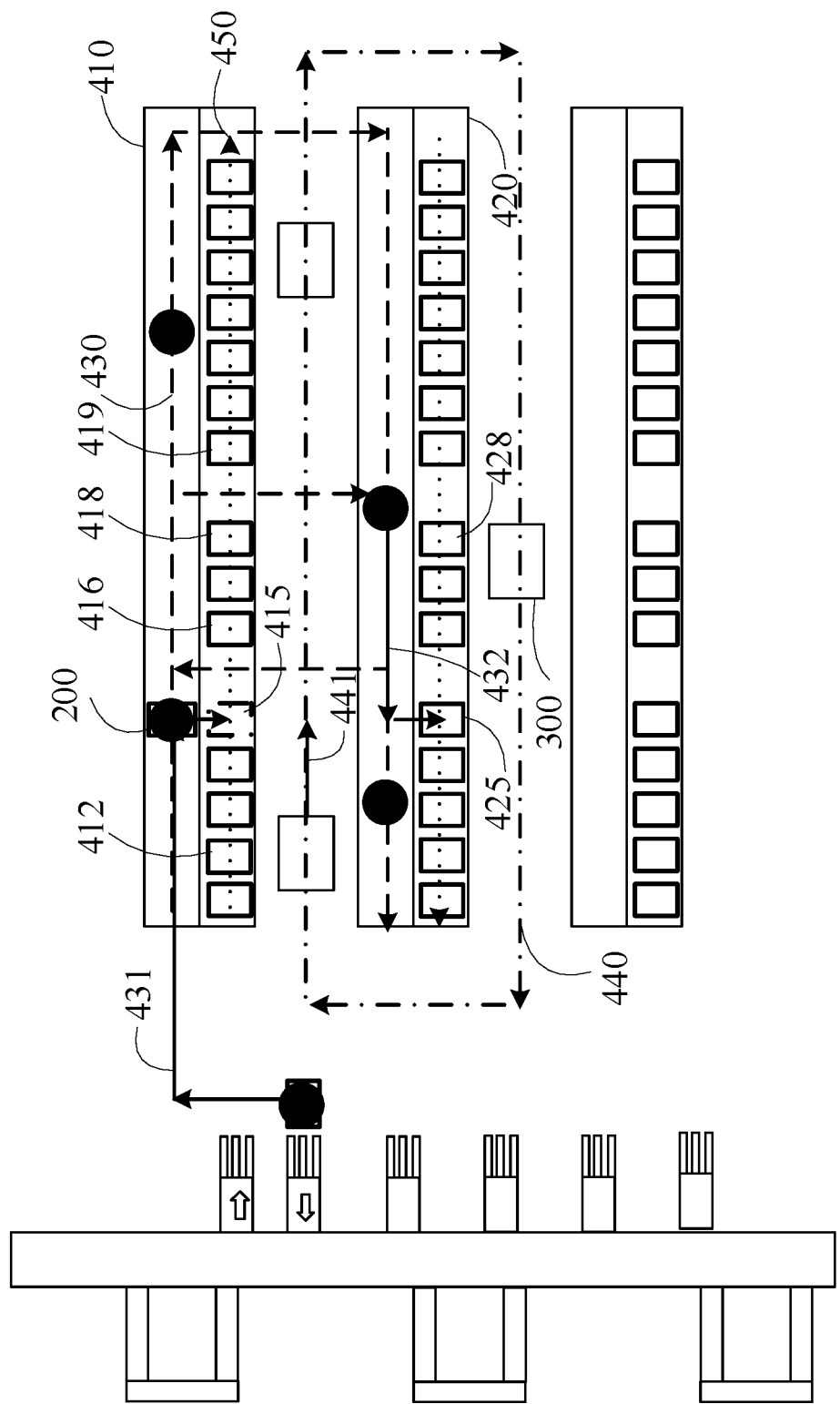
FIG. 12 shows a schematic diagram of an application scenario of ex-warehouse and in-warehouse control according to an embodiment of the present disclosure.

It should be noted that the storage positions on both sides of the channel between adjacent shelves may share a set of temporary storage positions, that is, the target storage position and the target temporary storage position may be located on two adjacent shelves respectively. For example, as shown in FIG. 12, when the target storage position is located above or below the fifth temporary storage position 415 of the first shelf 410, the first idle temporary storage position may be the fifth temporary storage position 415 of the first shelf 410, and may also be the fifth temporary storage position 425 of the second shelf 420. In this way, the storage positions located on both sides of the second robot driving channel 440 may share the temporary storage position on the first shelf 410.

The update of the temporary storage position below the target storage position to the idle state may be triggered by the second robot moving away the cargoes temporarily stored in the temporary storage position.

In an implementation, when there is not the second idle temporary storage position, the first idle temporary storage position is determined as the target temporary storage position. In this way, the target temporary storage position may be directly determined according to the target storage position.

In an implementation, the instructing the first robot to transfer the target cargo to the target temporary storage position, includes:

determining a first transfer route from the preset first robot channel according to position information between the first robot and the target temporary storage position, where the first robot channel includes a first driving channel located on one side of the temporary storage layer board where the target temporary storage position is located, and the first driving channel is located in a vertical projection area of the storage layer board where the target storage position is located; and instructing the first robot to drive to a lower side of the target temporary storage position along the first transfer route.

In an example, as shown in FIG. 12, FIG. 12 shows a schematic diagram of a scenario of an ex-warehouse and in-warehouse control methods according to embodiments of the present disclosure, where the line segment with an arrow indicates the first driving channel 430 located on a side of a temporary storage layer board where the target temporary storage position is located (referring to the first driving channel 141 in FIG. 4). When the target temporary storage position is a fifth temporary storage position 415 in the first shelf 410, the first transfer route 431 is determined from the first driving channel 430, and the first robot 200 is instructed to drive to a lower side of the fifth temporary storage position 415 along the first transfer route 431. In this way, the first robot 200 may drive in the preset first driving channel 430, so as to prevent the first robot 200 from occupying the driving channel of the second robot 300, and improve the driving efficiency between the first robot 200 and the second robot 300, thereby improving the in-warehouse efficiency.

In an implementation, the instructing the second robot to transfer the target cargo from the target temporary storage position to the target storage position, includes:

determining a second transfer route from a preset second robot channel according to position information between the second robot and the target temporary storage position, where the second robot channel is located outside a vertical projection area; and instructing the second robot to drive to a side of the target temporary storage position along the second transfer route.

In an example, as shown in FIG. 12, the second robot channel 440 (a dotted line with arrows) may be located outside the vertical projection area of the shelf. When the second robot 300 is located at a side of the second temporary storage position 412 of the first shelf 410, the second transfer route 441 between the side of the second temporary storage position 412 and the side of the fifth temporary storage position 415 is determined according to the position information between the second robot 300 and the target temporary storage position (namely, the fifth temporary storage position 415). The second robot 300 is instructed to drive along the second transfer route 441 to the side of the fifth temporary storage position 415 to take out the target cargo from the fifth temporary storage position 415.

In an implementation, as shown in FIGS. 4, 5, and 9, the second driving channel 142 is formed at one end of the temporary storage layer board 120. The temporary storage layer board 120 includes a plurality of temporary storage boards 122 for providing temporary storage positions, a third driving channel 143 is formed between at least two of the temporary storage boards 122, and the first robot channel 230 includes a second driving channel 142 and a third driving channel 143.

In an example, as shown in FIG. 12, one end of the first shelf 410 away from the docking platform 400 is formed with a second driving channel 142. There is a third driving channel (not marked in the figure) between the fifth temporary storage position 415 and the sixth temporary storage position 416 of the first shelf 410, and between the eighth temporary storage position 418 and the ninth temporary storage position 419 of the first shelf 410, and then the first robot 200 may determine a driving route from the third driving channel, and plan a shorter driving route for the first robot 200, improving the driving efficiency of the first robot 200.

In an implementation, the first robot channel includes a cargo access channel located below the temporary storage layer board, and the method further includes:

when the first robot is unloaded, determining an unloaded driving route from the first robot channel, and instructing the first robot to drive along the unloaded driving route.

In an example, as shown in FIG. 9 and FIG. 12, the first robot channel 230 includes a cargo access channel 450 located below the temporary storage layer board (referring to the cargo access channel 140 of the shelf 100 in FIG. 4), namely, the dashed line with the arrow in FIG. 4. When the first robot is unloaded (namely, the first robot does not carry cargoes), the first robot may drive in the first driving channel 430, the second driving channel, and the cargo access channel 450.

Embodiment 3

Figure 13:
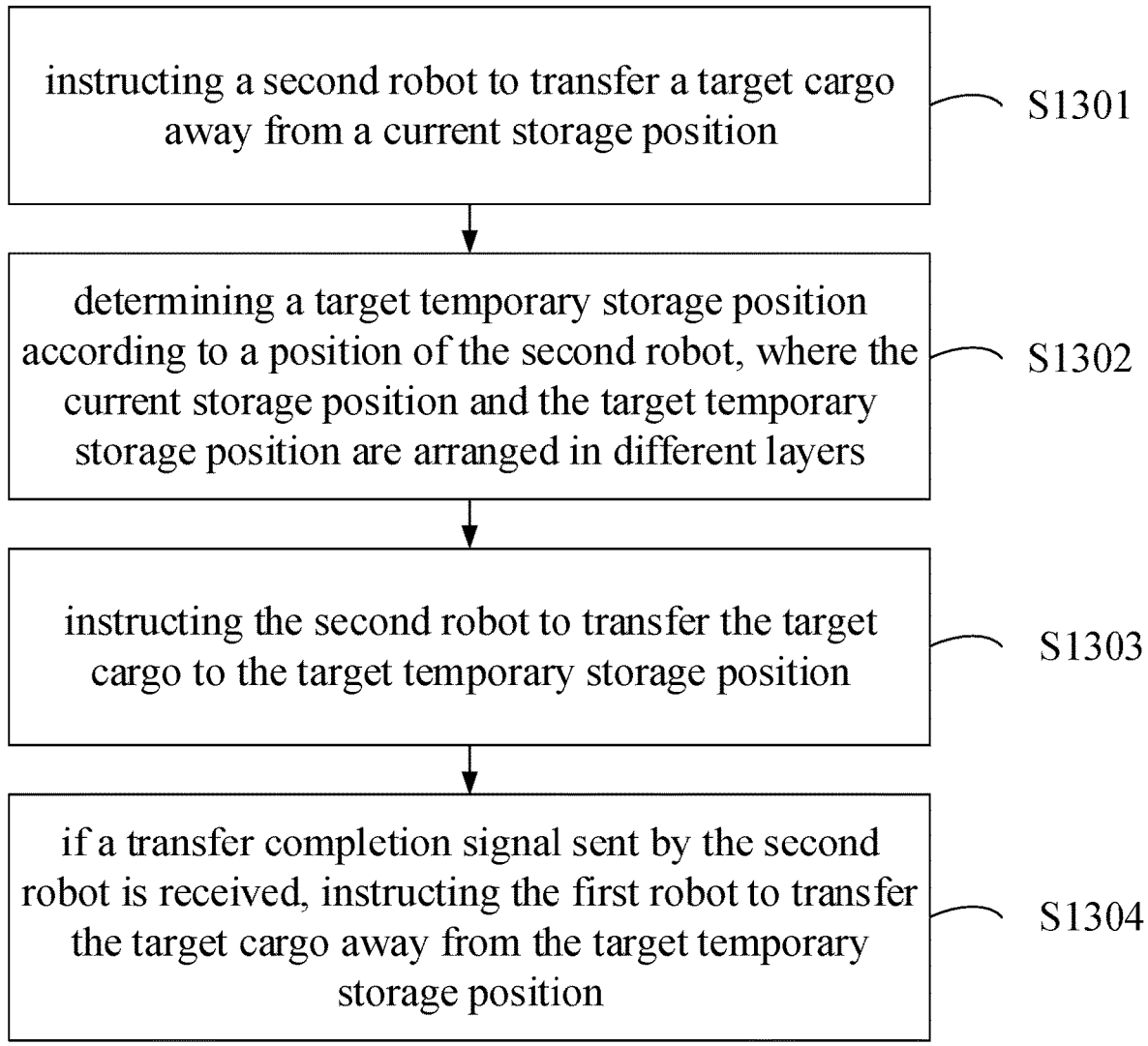
FIG. 13 shows a schematic flowchart of an ex-warehouse control method according to Embodiment 3 of the present disclosure.

FIG. 13 shows a schematic flowchart of an ex-warehouse control method according to Embodiment 3 of the present disclosure. The ex-warehouse control method is suitable for the warehousing apparatus applied to Embodiment 1 mentioned above. As shown in FIG. 13, the ex-warehouse control method may include:

S1301: instructing a second robot to transfer a target cargo away from a current storage position;

S1302: determining a target temporary storage position according to a position of the second robot, where the current storage position and the target temporary storage position are arranged in different layers;

S1303: instructing the second robot to transfer the target cargo to the target temporary storage position; and S1304: when a warehousing apparatus receives a transfer completion signal sent by the second robot, instructing the first robot to transfer the target cargo away from the target temporary storage position.

A setting manner of the temporary storage position and the storage position in the ex-warehouse control method may be the same as the setting manner thereof in the in-warehouse control method, and the setting manner of the temporary storage position and the storage position is not repeated herein again.

The current storage position of the target cargo may be determined according to identification information of the target cargo in an ex-warehouse list. For example, a relationship mapping table between the current storage position of the target cargo and the identification information of the target cargo may be stored in advance. When the identification information of the target cargo is obtained from the ex-warehouse list, the current storage position of the target cargo may be queried from the relationship mapping table. The current storage position of the target cargo may also be determined in other ways, and the determining manner of the current storage position of the target cargo is not limited in the embodiments of the present disclosure.

In an example, since the target temporary storage position may temporarily store the target cargo, when a warehousing apparatus receives a transfer completion signal sent by the second robot, the first robot may be immediately instructed to transfer the target cargo away from the target temporary storage position, or the first robot may be also instructed to transfer the target cargo away from the target temporary storage position after the first robot has completed other operations. In this way, the first robot and the second robot may use the temporary storage position to independently transfer the target cargo, and the first robot and the second robot can drive high-efficiently with no need to directly cooperate to transfer the target cargo, which can improve the ex-warehouse efficiency of the cargoes.

In an example, according to the ex-warehouse control method, the second robot may be instructed to transfer the plurality of target cargoes away from the current storage positions of the plurality of target cargoes respectively.

Corresponding target temporary storage positions are respectively determined according to the position of the second robot. The second robot is instructed to transfer the target cargo to a corresponding target temporary storage position. In this way, the plurality of target cargoes may be transferred to the corresponding target temporary storage positions.

According to the ex-warehouse control method of the embodiment of the present disclosure, the target temporary storage position is determined based on the position of the second robot, and the second robot is instructed to transfer the target cargo to the target temporary storage position and the first robot is instructed to transfer the target cargo away from the target temporary storage position respectively, so as to separate the transfer of the target cargo between the temporary storage position and the storage position from the ground transfer of the target cargo, so that the second robot may independently complete the transfer of the target cargo between the storage position and the temporary storage position, and the first robot may independently complete transfer of the target cargo away from the target temporary storage position. There is no need for the first robot and the second robot to directly dock the target cargo, which avoids a phenomenon that the first robot and the second robot wait for each other, and helps improve the ex-warehouse efficiency of the cargoes.

It should be noted that a robot integrated with a lifting mechanism and an access mechanism is usually used in the ex-warehouse and in-warehouse control methods to transfer and access cargoes; however, due to the high cost of such the robot, and there are relatively long distances between a docking platform for the cargoes and each temporary storage position and each storage position in the shelf, the ex-warehouse and in-warehouse costs of the cargoes per unit time are relatively high, and the efficiency is relatively low.

According to the ex-warehouse and in-warehouse control methods of the embodiments of the present disclosure, the ground transfer of the target cargoes is separated from the transfer of the target cargoes between the temporary storage position and the storage position. Therefore, the first robot may concentrate on completing the ground transfer of the target cargoes, and the second robot may concentrate on completing the transfer of the target cargoes between the temporary storage position and the storage position. The first robot may not have a lifting mechanism, and the cost thereof is much lower than that of the second robot. In this way, one second robot may be used to indirectly cooperate with a plurality of first robots to perform ex-warehouse and in-warehouse control of the target cargoes. This may reduce the ex-warehouse and in-warehouse costs of the target cargoes per unit time and may improve the ex-warehouse and in-warehouse efficiency and the ex-warehouse and in-warehouse capacity of the cargoes.

In an implementation, a driving speed of the first robot is greater than a driving speed of the second robot.

In the ex-warehouse control, the first robot usually transfers the target cargo from the target temporary storage position of the shelf to the docking platform. The second robot usually transfers the target cargo from the current storage position to the target temporary storage position on one side of the shelf. A distance between the docking platform and the shelf is much greater than the length of the shelf. Therefore, by enabling a driving speed of the first robot greater than a driving speed of the second robot, the number of the target cargoes transferred by the second robot to the target temporary storage position may be adapted to the number of target cargoes transferred by the first robot away from the target temporary storage position. Therefore, the transfer efficiency of the second robot is adapted to the transfer efficiency of the first robot, thereby improving the ex-warehouse efficiency of the target cargoes.

In an example, according to the in-warehouse control method, a plurality of first robots may be arranged to cooperate with the second robot, so as to match an ex-warehouse temporary storage flow of the target cargoes with an ex-warehouse storage flow.

Figure 14:
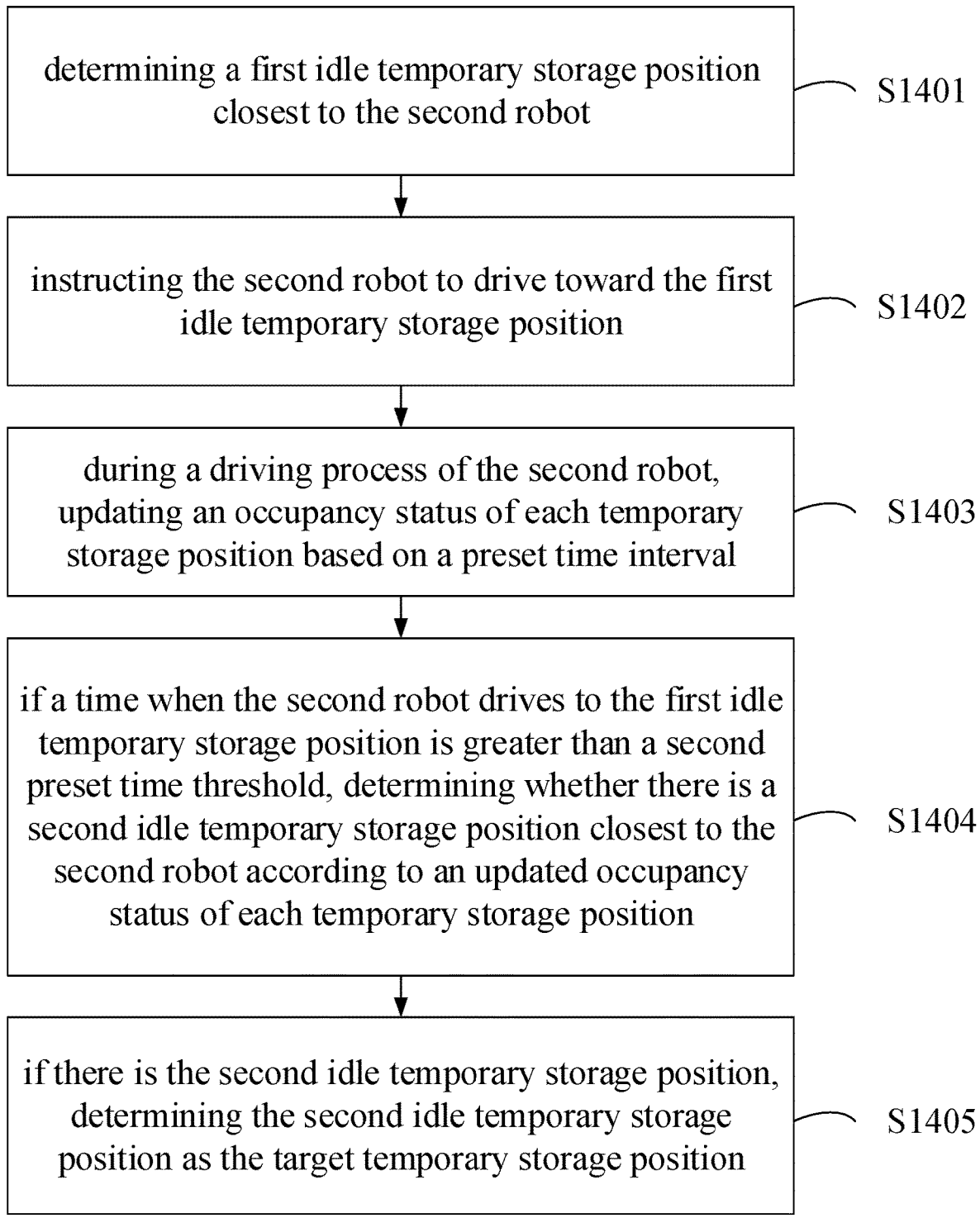
FIG. 14 shows a schematic flowchart of the operation S1302 in FIG. 13.

For example, as shown in FIG. 14, the operation S1302: determining the target temporary storage position according to the position of the second robot, may include:

S1401: determining a first idle temporary storage position closest to the second robot;

S1402: instructing the second robot to drive toward the first idle temporary storage position;

S1403: during a driving process of the second robot, updating an occupancy status of each of temporary storage positions based on a preset time interval;

S1404: when a time that the second robot drives to the first idle temporary storage position is greater than a second preset time threshold, determining whether there is a second idle temporary storage position closest to the second robot according to an updated occupancy status of each of the temporary storage positions; and S1405: when there is the second idle temporary storage position closer to the target storage position, determining the second idle temporary storage position as the target temporary storage position.

In an example, as shown in FIG. 12, when the second robot 300 is located on one side of the second temporary storage position 412 of the first shelf 410, the fifth temporary storage position 415 of the first shelf 410 may be determined as the first idle temporary storage position of the second robot 300. If the occupancy status of the fourth temporary storage position 414 of the first shelf 410 is updated to idle during the process of the second robot 300 driving towards the first idle temporary storage position, and if a time when the second robot 300 drives to the fifth temporary storage position 415 is greater than the second preset time threshold, the fourth temporary storage position 414 is determined to be the second idle temporary storage position closest to the second robot 300. The fourth temporary storage position is determined as the target temporary storage position. In this way, during the process of the second robot 300 transferring the target cargoes, the target temporary storage position may be dynamically adjusted, so as to reduce the transfer distance of the second robot 300 and improve the ex-warehouse efficiency of the cargoes.

The update of the temporary storage position below the target storage position to the idle state may be triggered by the first robot transferring away the cargoes temporarily stored in the temporary storage position.

In an implementation, when there is not the second idle temporary storage position, the first idle temporary storage position is determined as the target temporary storage position, to directly determine the target temporary storage position.

In an implementation, the instructing the first robot to transfer the target cargo away from the target temporary storage position, includes:

determining a transfer-away route from the preset first robot channel according to position information between the first robot and the target temporary storage position, where the first robot channel includes a first driving channel located on one side of the temporary storage layer board where the target temporary storage position is located, and the first driving channel is located in a vertical projection area of the storage layer board where the target storage position is located; and instructing the first robot to drive to a lower side of the target temporary storage position along the transfer-away route.

In an example, as shown in FIG. 12, when the first robot 200 is located in a position near the eighth temporary storage position 428 in the first driving channel of the second shelf 420, and the target temporary storage position is the fifth temporary storage position 425 of the second shelf 420, a transfer-away route 432 between the first robot 200 and the fifth temporary storage position 425 of the second shelf 420 is determined according to the position information between the first robot 200 and the target temporary storage position (namely, the fifth temporary storage position 425 of the second shelf). The first robot 200 is instructed to drive along the transfer-away route 432 to a lower side of the target temporary storage position (namely, the fifth temporary storage position 425 of the second shelf) to transfer the target cargo away from the target temporary storage position.

Embodiment 4

Figure 15:
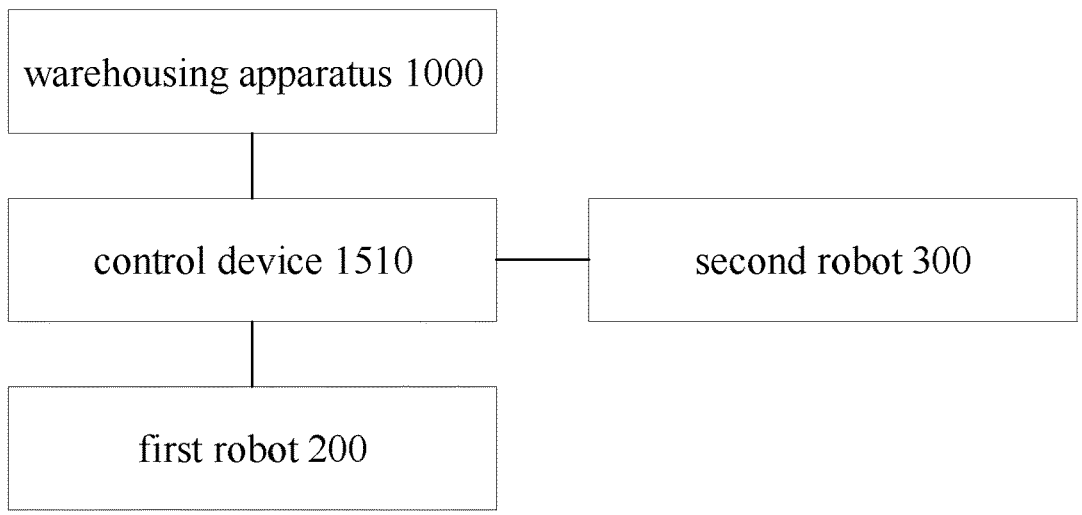
FIG. 15 shows a schematic structural diagram of a warehousing system according to Embodiment 4 of the present disclosure.
Figure 16:
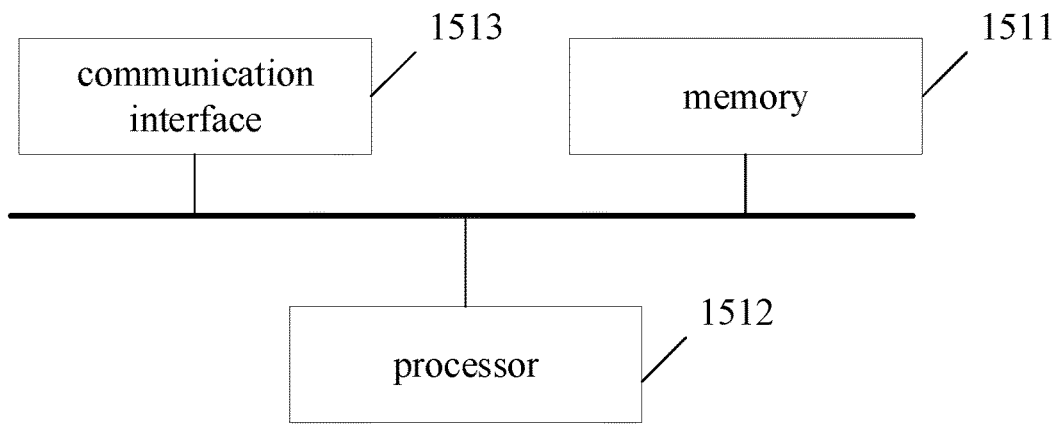
FIG. 16 shows a schematic structural diagram of a control device according to Embodiment 4 of the present disclosure.

FIG. 15 shows a structural block diagram of a warehousing system according to Embodiment 4 of the present disclosure. As shown in FIG. 15 and FIG. 16, the warehousing system 1500 includes: a warehousing apparatus 1000 of any one of the foregoing implementations; a control device 1510, including a processor 1512 and a memory 1511, where the memory 1511 stores instructions, and the instructions, when being loaded and executed by the processor 1512, implement the method of any one of the foregoing implementations; a first robot 200, driving on the first robot channel and having a furcal arm cooperating with a furcal groove; and a second robot 300, driving on the second robot channel.

In an implementation, a driving speed of the first robot 200 is greater than a driving speed of the second robot 300.

FIG. 16 shows a structural block diagram of a control device according to Embodiment 4 of the present disclosure. As shown in FIG. 16, the control device 1510 includes: a memory 1511 and a processor 1512, where a computer program executable on the processor 1512 is stored in the memory 1511. The processor 1512, when executing the computer program, implements the in-warehouse control method and the ex-warehouse control method in the foregoing embodiments. There may be one or more memories 1511 and processors 1512.

The control device further includes: a communication interface 1513, which is used to communicate with an external device and perform data interactive transmission.

If the memory 1511, the processor 1512, and the communication interface 1513 are independently implemented, the memory 1511, the processor 1512, and the communication interface 1513 may be connected to each other through a bus and communicate with each other. The bus may be an Industry Standard Architecture (ISA) bus, a Peripheral Component Interconnect (PCI) bus, an Extended Industry Standard Architecture (EISA) bus, or the like. The bus may include an address bus, a data bus, a control bus, and the like. For ease of representation, only one thick line is used to represent the bus in FIG. 16, but it does not mean that there is only one bus or one type of bus.

Optionally, in a specific implementation, if the memory 1511, the processor 1512, and the communication interface 1513 are integrated on one chip, the memory 1511, the processor 1512, and the communication interface 1513 may communicate with each other through an internal interface.

The foregoing processor may be a central processing unit (CPU), and may also be other general-purpose processors, a digital signal processing (DSP), an application specific integrated circuit (ASIC), a field programmable gate array FPGA) or other programmable logic devices, a discrete gate or transistor logic device, a discrete hardware component, or the like. The general-purpose processor may be a microprocessor or any conventional processor. It should be noted that the processor may be a processor supporting the advanced reduced instruction-set computer machine (advanced RISC machines, ARM) architecture.

Optionally, the above memory may include a program storage area and a data storage area, where the program storage area may store an operating system, and an application program required for at least one function; and the data storage area may store data created according to the use of the control device and the like. In addition, the memory may include a high speed random access memory, and may also include a non-transitory memory, such as at least one disk storage device, a flash memory device, or other non-transitory solid state storage devices. In some embodiments, the memory may optionally include a memory remotely located with respect to the processor, and these remote memories may be connected, via a network, to the control device. Examples of the above networks may include, but are not limited to, the Internet, an intranet, a local area network, a mobile communication network, and combinations thereof.

Embodiment 5

Embodiment 5 of the present disclosure further provides a docking platform, applicable to the warehousing apparatus of any one of the foregoing implementations. The docking platform will be described below with reference to the accompanying drawings.

Figure 17:
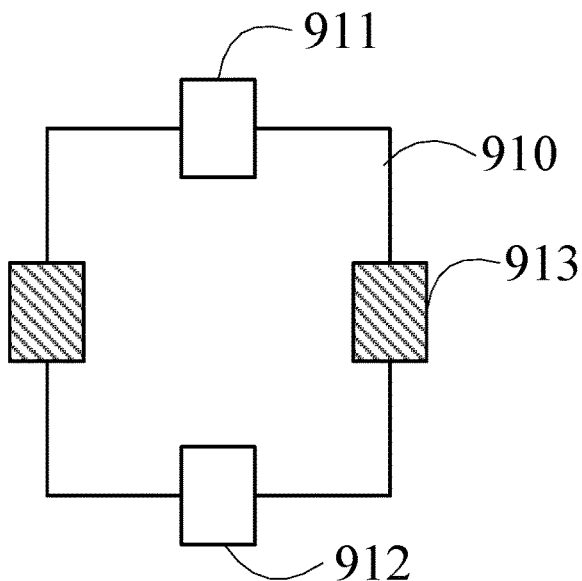
FIG. 17 shows a schematic diagram of a layout of steering wheels and actuating wheels of a first robot.

As shown in FIG. 17, a chassis 910 of the first robot (the first robot may be referred to as a transfer robot) is usually provided with a front steering wheel 911, a rear steering wheel 912, and actuating wheels 913, where the front steering wheel 911 and the rear steering wheel 912 are respectively arranged at the front and rear positions of the chassis 910 to change a driving direction of the first robot; and the actuating wheels 913 are arranged on both sides of the chassis 910 and are connected to the chassis 910 through a suspension mechanism (not shown in the figure), to provide an actuating force for the first robot. When the first robot drives to a hole, the actuating wheels 913 may extend the suspension mechanism; and when the first robot drives to a raised ground, the actuating wheels 913 may compress the suspension mechanism to buffer the impact on the body of the first robot caused by the uneven ground. It should be noted that, in order to simplify the drawings, in the embodiment of the present disclosure, the front steering wheel 911, the rear steering wheel 912, the actuating wheels 913, and the chassis 910 of the first robot are used to illustrate the driving of the first robot.

Figure 18:
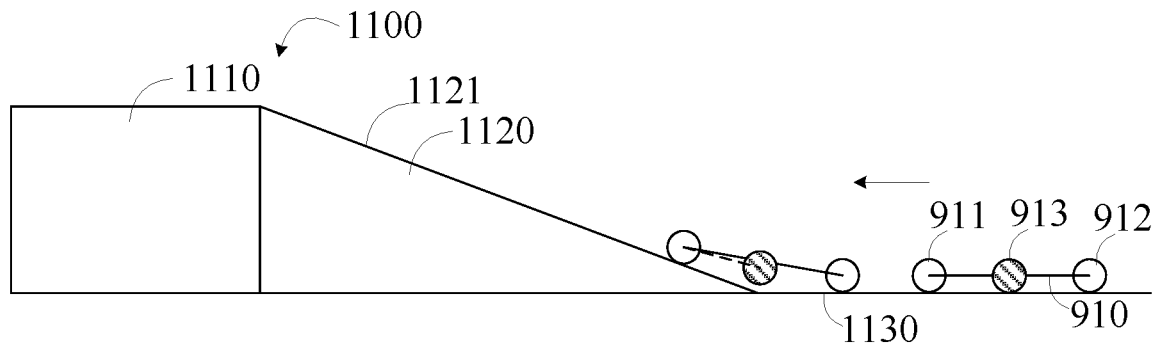
FIG. 18 shows a schematic diagram of a position between a chassis and a slope when a first robot climbs a slope.

As shown in FIG. 18, since the slope surface 1121 of the slope 1120 of the docking platform 1100 is a plane, and the actuating wheels 913 of the first robot have a relatively small stretching or compressing range relative to the chassis 910, the actuating wheels 913 are substantially coplanar with the front steering wheel 911 and the rear steering wheel 912. When the first robot starts to climb the slope, the front steering wheel 911 of the first robot drive to the slope 1121, and the rear steering wheel 912 drive on the ground 1130. If the slope 1120 has a relatively large slope gradient, the front side of the chassis 910 lifts higher relative to the ground, which is easy to make the actuating wheels 913 hang in the air and unable to exert a grip face on the slope 1121, or the actuating wheels 913 can contact the slope surface 1121 but cannot exert a sufficient grip face on the slope surface 1121 due to the insufficient pressure. This causes the actuating wheels 913 of the first robot to slip, so that the first robot cannot drive along the slope 1120 to the platform body 1110. In order to enable the actuating wheels 913 of the first robot to exert the sufficient grip face on the slope surface 1121 of the slope 1120, the slope gradient of the slope 1120 is usually reduced by increasing the length of the slope, which may consume more manufacturing materials and occupy more space, so that there are the problems that the docking platform 1100 has high manufacturing cost and large space occupation.

Based on this, Embodiment 2 of the present disclosure provides a docking platform. The slope surface of the slope platform along the direction from a slope bottom to a slope top is set as a concave slope surface and a convex slope surface that are smoothly connected to each other, which is beneficial to shorten the length of the slope platform, and may save manufacturing cost and reduce the space occupation.

Figure 19A:
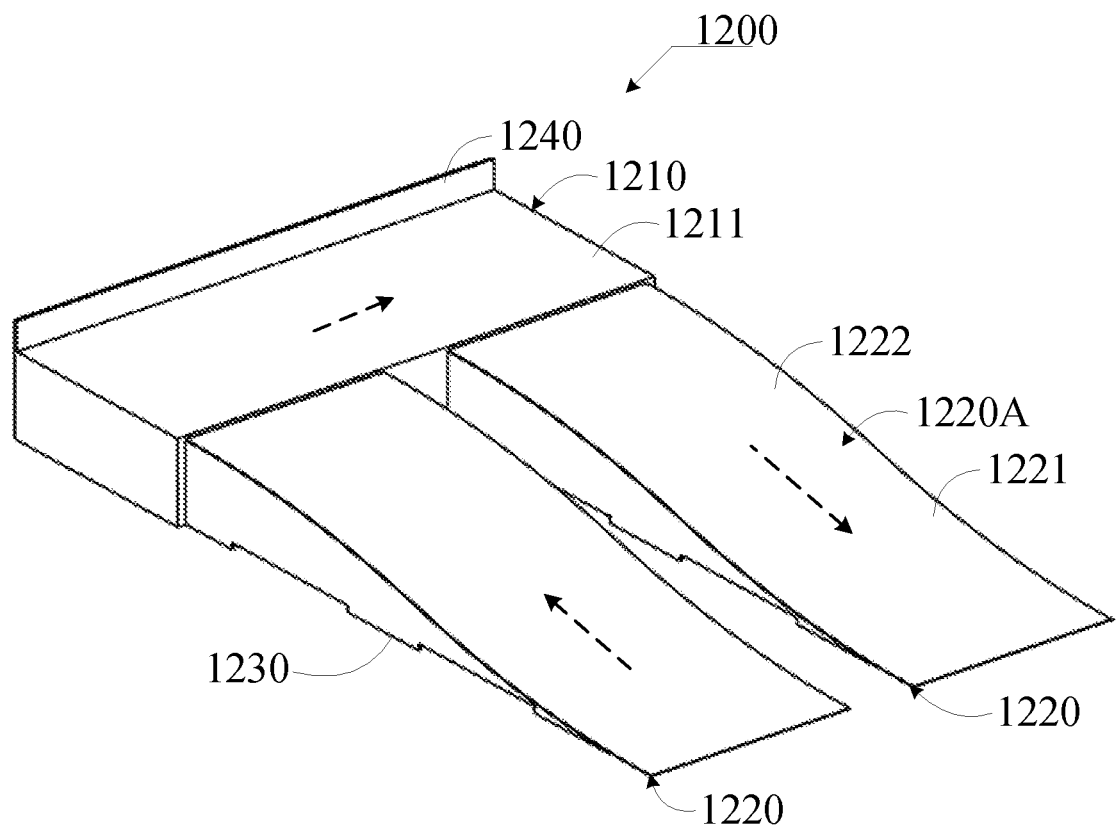
FIG. 19A shows a first structural schematic diagram of a docking platform according to Embodiment 5 of the present disclosure.
Figure 19B:
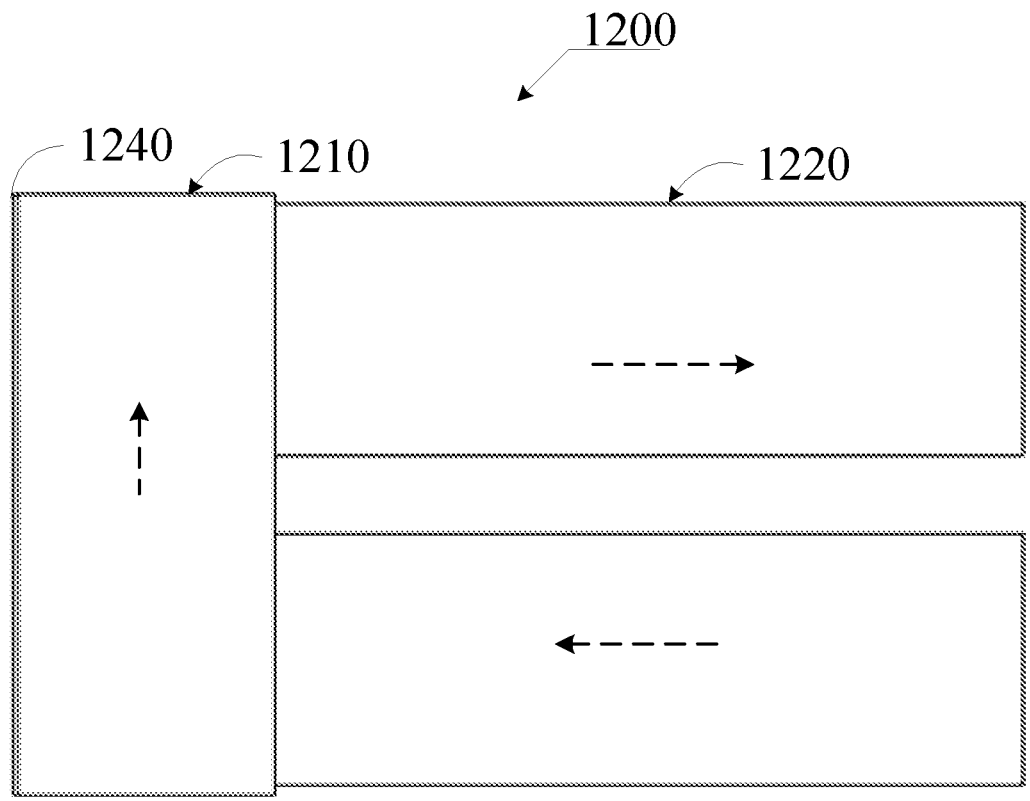
FIG. 19B shows a top view of a first structural schematic diagram of a docking platform according to Embodiment 5 of the present disclosure.
Figure 19C:
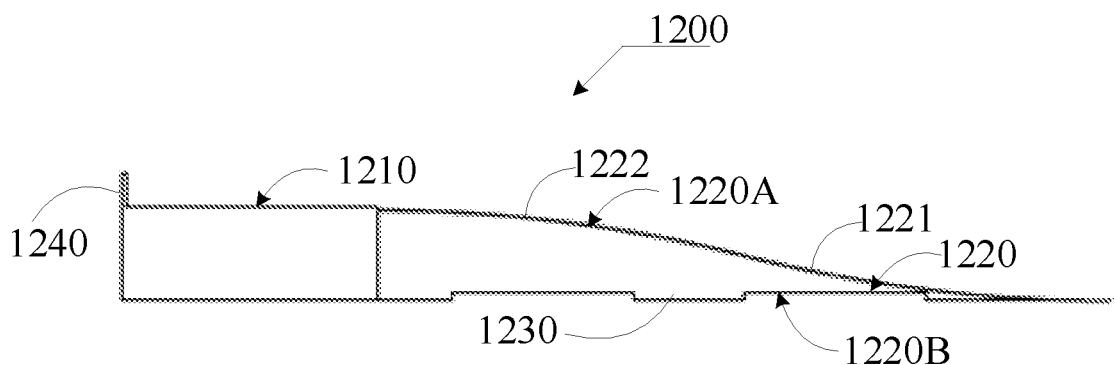
FIG. 19C shows a side view of a first structural schematic diagram of a docking platform according to Embodiment 5 of the present disclosure.

FIG. 19A shows a first structural schematic diagram of a docking platform according to Embodiment 5 of the present disclosure, FIG. 19B shows a top view of a first structural schematic diagram of a docking platform according to Embodiment 5 of the present disclosure, and FIG. 19C shows a side view of a first structural schematic diagram of a docking platform according to Embodiment 5 of the present disclosure.

As shown in FIG. 19A to FIG. 19C, the docking platform 1200 may include: a platform body 1210 and a slope platform 1220. A slope surface 1220A of the slope platform 1220 includes a concave slope surface 1221 and a convex slope surface 1222 that are arranged in a direction from a slope bottom to a slope top. A top edge of the concave slope surface 1221 is smoothly connected to a bottom edge of the convex slope surface 1222; and the slope platform 1220 is arranged on one side of the platform body 1210, so that the slope surface 1220A is smoothly engaged with a top surface 1211 of the platform body 1210.

For example, the platform body 1210 may have a three-dimensional shape, such as a three-dimensional rectangle or a three-dimensional square. The top surface 1211 of the platform body 1210 may form a driving channel of the first robot, for example, the driving channel may be distributed along a length direction of the platform body 1210. Because the platform body 1210 has a specific height, when the first robot drives to the top surface 1211, it is convenient for the user to perform a transit operation on the carried cargoes. A height of the platform body 1210 may be selected and adjusted according to actual needs, which is not limited in this embodiment of the present disclosure.

In an example, the slope surface 1220A of the slope platform 1220 includes a concave slope surface 1221 and a convex slope surface 1222 that are arranged in sequence along a direction from a slope bottom to a slope top. The top edge of the concave slope surface 1221 is tangent to the bottom edge of the convex slope surface 1222 for smooth connection.

Figure 20A:
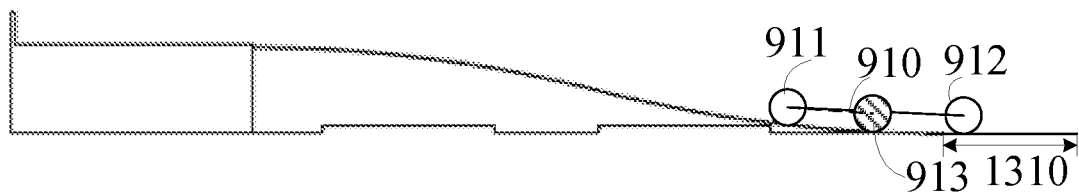
FIG. 20A shows a first schematic diagram of a state of a first robot driving along a slope platform to a platform body according to Embodiment 5 of the present disclosure.

Optionally, also referring to FIG. 20A, the bottom edge of the concave slope surface 1221 may be tangent to the ground, so that the slope gradient of the concave slope surface 1221 may be gradually increased from 0°; and the top edge of the convex slope surface 1222 may be tangent to the top surface 1211 of the platform body 1210, so that the slope gradient of the convex slope surface 1222 is gradually reduced to 0°.

Specifically, the concave slope surface 1221 is located on a side of a slope bottom side of the slope platform 1220 and is concave toward the bottom surface 1220B of the slope platform 1220. The slope gradient of the concave slope surface 1221 gradually increases from 0 along the direction from a slope bottom to a slope top, and increases to a preset slope gradient value at the top of the concave slope surface 1221. In other words, a tangent value of the concave slope surface 1221 increases gradually along a vertical height direction of the concave slope surface 1221. In this way, the slope gradient of the slope platform 1220 near the side of the slope bottom may be gradually increased, which is beneficial to shorten the length of the slope platform 1220 on the side of the slope bottom and save the manufacturing cost.

The convex slope surface 1222 is located on a side of the slope top of the slope platform 1220. The convex slope surface 1222 protrudes in a direction away from the bottom surface 1220B of the slope platform 1220. The slope gradient of the convex slope surface 1222 gradually decreases from a preset slope gradient value along the direction from a slope bottom to a slope top. The slope gradient of the convex slope surface 1222 is smoothly engaged with the top surface 1211 of the slope platform 1220 at the top of the convex slope surface 1222. In other words, a tangent value of the convex slope surface 1222 decreases gradually along a vertical height direction of the convex slope surface 1222. In this way, the concave slope surface 1221, the convex slope surface 1222, and the platform body 1210 may be smoothly transitioned. Therefore, the first robot may drive smoothly on the slope platform 1220 and the platform body 1210; and the length of the slope platform 1220 on the side of the slope top may also be shortened to save manufacturing cost.

Also referring to FIG. 19C and FIG. 20A, during the process of the first robot driving along the slope platform 1220 to the platform body 1210, when the front steering wheel 911 of the first robot drives to the concave slope surface 1221, and the rear steering wheel 912 are still driving on the ground 410, the concave slope surface 1221 may reduce a lifting height of a front side of the chassis 910 relative to the ground 410 to prevent the actuating wheels 913 from being lifted excessively, so that the actuating wheels 913 can apply an actuating force to the concave slope surface 1221 and prevent the actuating wheels 913 from slipping.

Figure 20B:
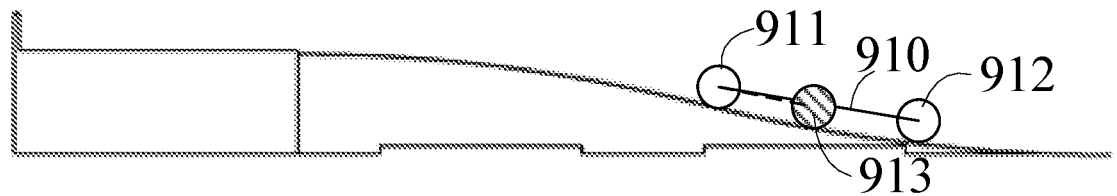
FIG. 20B shows a second schematic diagram of a state of a first robot driving along a slope platform to a platform body according to Embodiment 5 of the present disclosure.

Also referring to FIG. 19C and FIG. 20B, when both the front steering wheel 911 and the rear steering wheel 912 of the first robot are driving on the concave slope surface 1221, the actuating wheels 913 slightly stretch the suspension mechanism, so that the centers of the actuating wheels 913 are slightly moved downward relative to the chassis 910, and the actuating wheels 913 can exert the sufficient actuating force on the concave slope surface 1221 to actuate the first robot to drive towards the convex slope surface 1222.

Figure 20C:
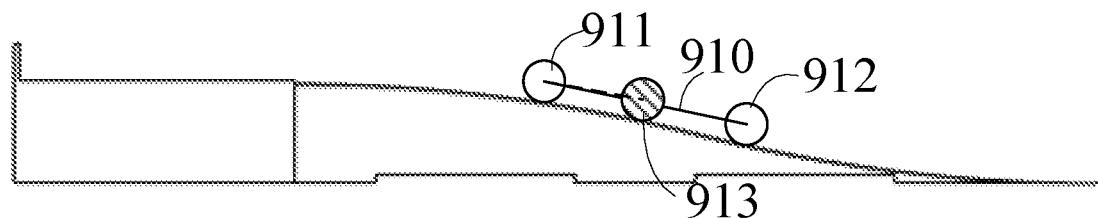
FIG. 20C shows a third schematic diagram of a state of a first robot driving along a slope platform to a platform body according to Embodiment 5 of the present disclosure.
Figure 20D:
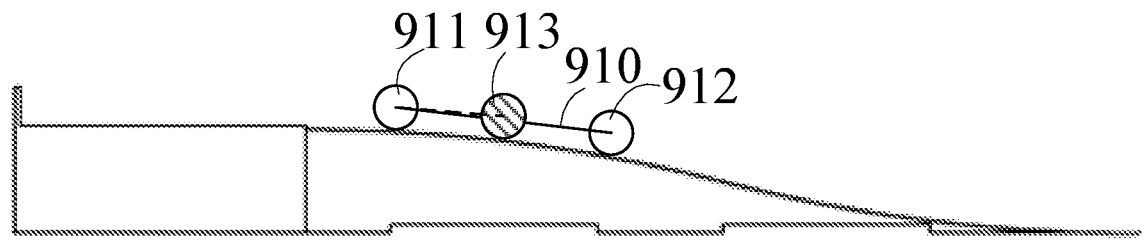
FIG. 20D shows a fourth schematic diagram of a state of a first robot driving along a slope platform to a platform body according to Embodiment 5 of the present disclosure.

Also referring to FIG. 19C, FIG. 20C, and FIG. 20D, when the actuating wheels 913 of the first robot actuate the front steering wheel 911 to drive on the convex slope surface 1222 and drive the rear steering wheel 912 to drive from the concave slope surface 1221 to the convex slope surface 1222, the centers of the actuating wheels 913 gradually move toward a direction close to the chassis 910, and starts to compress the suspension mechanism. When both the front steering wheel 911 and the rear steering wheel 912 of the first robot are driving on the convex slope surface 1222, the actuating wheels 913 slightly compress the suspension mechanism. Therefore, the actuating wheels 913 can exert the sufficient actuating force on the convex slope surface 1222 to actuate the first robot to drive towards the platform body 1210.

Figure 20E:
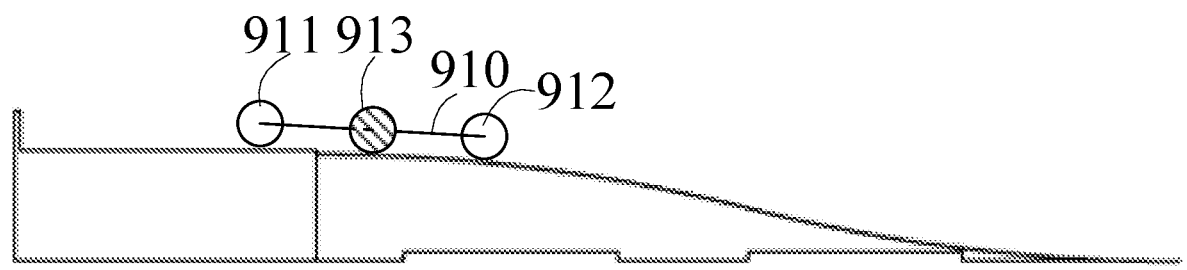
FIG. 20E shows a fifth schematic diagram of a state of a first robot driving along a slope platform to a platform body according to Embodiment 5 of the present disclosure.
Figure 21:
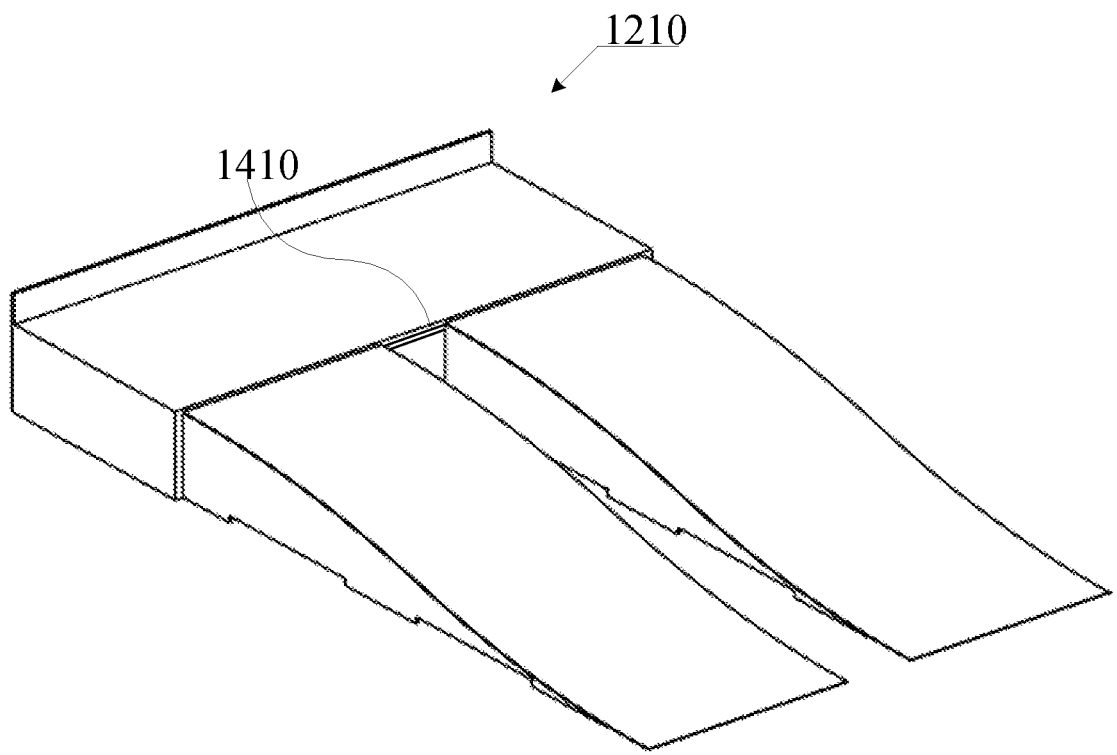
FIG. 21 shows a second structural schematic diagram of a docking platform according to Embodiment 5 of the present disclosure.
Figure 22:
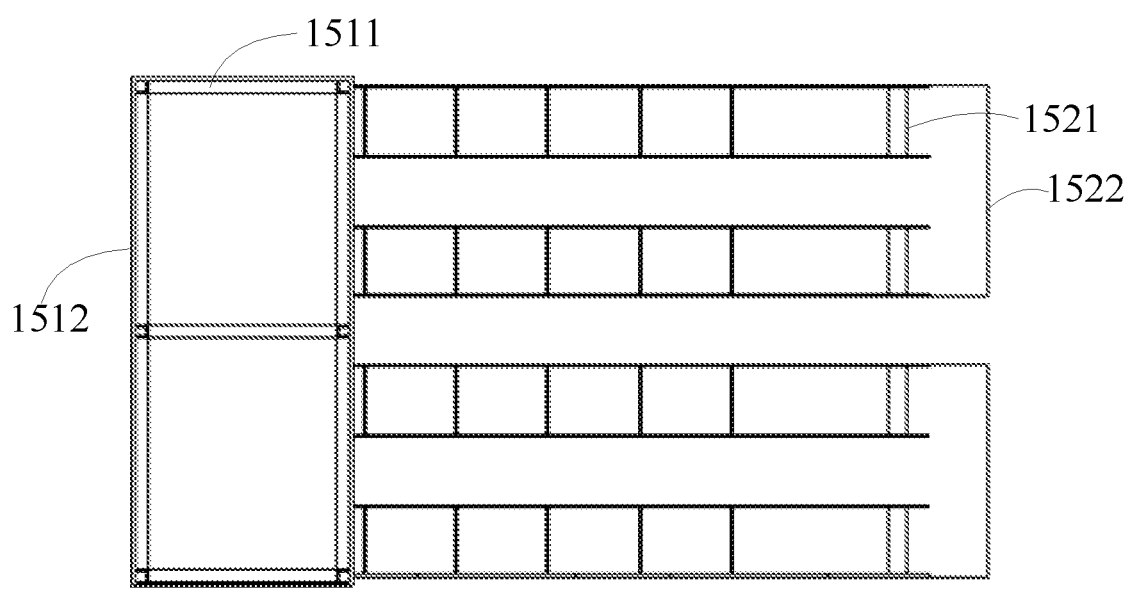
FIG. 22 shows a third structural schematic diagram of a docking platform according to Embodiment 5 of the present disclosure.

Also referring to FIG. 19C and FIG. 20E, when the actuating wheels 913 of the first robot actuate the front steering wheel 911 to drive on the platform body 1210 and drive the rear steering wheel 912 to drive from the convex slope surface 1222 to the platform body 1210, the centers of the actuating wheels 913 gradually move toward the direction close to the chassis 910 under the elastic force of the suspension mechanism. Since the convex slope surface 1222 is smoothly engaged with the top surface 1211 of the platform body 1210, it may be avoided that the actuating wheels 913 cannot apply the sufficient actuating force to the convex slope surface 1222 due to the excessive compression of the suspension mechanism.

In an embodiment, referring to FIG. 19C, a projection of the concave slope surface 1221 in the vertical direction is a first arc (referring to the concave slope surface 1221 in FIG. 19C). A projection of the convex slope surface 1222 in the vertical direction is the second arc (referring to the convex slope surface 1222 in FIG. 19C), An arc radius of the first arc is greater than or equal to an arc radius of the second arc. For example, the arc radius of the first arc may be between 8000 mm to 10700 mm, the arc radius of the second arc may be between 500 mm to 2832 mm, and the arc radiuses of the first arc and the second arc may be selected and adjusted according to actual needs, which is not limited in this embodiment of the present disclosure.

In this embodiment, by setting the arc radius of the first arc to be greater than or equal to the arc radius of the second arc, the slope gradient of the concave slope surface 1221 may be the same as the slope gradient of the convex slope surface 1222, or the slope gradient of the concave slope surface 1221 is gentler than the slope gradient of the convex slope surface 1222. This is beneficial for the first robot to drive smoothly along the concave slope surface 1221 and the convex slope surface 1222.

In an implementation, a length of a first arc is equal to or greater than a length of a second arc. The length of the first arc and the length of the second arc may be selected and adjusted according to actual needs, which are not limited in this embodiment of the present disclosure.

In an implementation, as shown in FIG. 19A and FIG. 19C, the docking platform 1200 may further include a plurality of support pads 1230, and the plurality of support pads 1230 are arranged at the bottom of the slope platform 1220 at an interval along the length direction of the slope platform 1220.

In an example, the slope platform 1220 and the plurality of support pads 1230 may be an integral piece or separate pieces. If the slope platform 1220 and the plurality of support pads 1230 are separate pieces, the slope platform 1220 and the plurality of support pads 1230 may be combined into an integral piece.

In an example, there may be three support pads 1230, and the three support pads 1230 are respectively disposed on a front side, a middle position, and a rear side of the bottom of the slope platform 1220.

In this implementation, a plurality of support pads 1230 are arranged at the bottom of the slope platform 1220 along the length direction of the slope platform 1220 at an interval, so that the slope platform 1220 may be elevated and an arch portion may be formed between adjacent support pads 1230. In this way, the bottom of the support pads 1230 may be contacted with the ground to reduce a contact area between the bottom of the slope platform 1220 and the ground, to prevent the slope platform 1220 from shaking due to uneven ground, so that the slope platform 1220 can be placed on the ground stably.

In an implementation, as shown in FIG. 19A to FIG. 19C, the docking platform 1200 may further include a baffle plate 1240. The baffle plate 1240 is arranged on the top of the platform body 1210 and located on the side of the platform body 1210 away from the slope platform 1220. For example, the baffle plate 1240 may be arranged on a side of the top surface 1211 of the platform body 1210 away from the slope platform 1220. The baffle plate 1240 and the platform body 1210 may be an integral piece or separate pieces. The baffle plate 1240 may be arranged to protect the first robot and prevent the first robot from falling from the side of the platform body 1210 away from the slope platform 1220.

In an implementation, as shown in FIG. 19A to FIG. 19C, a side wall of the platform body 1210 opposite to the slope platform 1220 is provided with a clamping groove 1410, and a side wall of the slope platform 1220 opposite to the platform body 1210 is provided with a clamping strip (not shown in the figure), and the clamping strip is clamped in the clamping groove 1410, so that the slope platform 1220 is clamped with the platform body 1210.

In this implementation, the clamping groove 1410 is arranged on the platform body 1210 and the clamping strip is arranged on the slope platform 1220, so that the platform body 1210 and the slope platform 1220 may be clamped into an integral piece, which is convenient for assembly, disassembly, transportation, storage, and the like. It may be understood that the platform body 1210 and the slope platform 1220 may also be set as an integral piece according to actual needs, and an arrangement form of the platform body 1210 and the slope platform 1220 is not limited in this embodiment of the present disclosure.

In an implementation, the clamping groove 1410 is arranged along the length direction of the platform body 1210, and the clamping strip is arranged along the width direction of the slope platform 1220. There are at least two slope platforms 1220, and the clamping strips of two of the slope platforms 1220 is slidable along the clamping groove 1410 to adjust a spacing.

In an example, the clamping groove 1410 is arranged along the length direction of the platform body 1210 and is located on the side wall opposite to the slope platform 1220; the clamping strip is arranged along the width direction of the slope platform 1220 and is located on the side wall opposite to the platform body 1210; the clamping strip is slidable along the clamping groove 1410, and may adjust the position of the slope platform 1220 on the platform body 1210 to improve the flexibility of an assembly position of the slope platform 1220.

In an example, a driving track label of the first robot may be set on the ground. When there are at least two slope platforms 1220, the clamping strips of the slope platforms 1220 slides along the clamping groove 1410 of the platform body 121010 adjust the spacing between the slope platforms 1220, so as to align the slope platforms 1220 with the driving track label. Therefore, the first robot can drive to the slope platform 1220 along the driving track label. The travel track label is a label used to guide the first robot to drive. In addition, the spacing between the slope platforms 1220 may also be adjusted according to a size of the cargo carried by the first robot, so that the spacing between the slope platforms 1220 is adapted to the size of the cargo. It should be noted that the number of the slope platforms 1220 may be selected and adjusted according to actual needs, and the number of the slope platforms 1220 is not limited in the present disclosure.

In an implementation, as shown in FIG. 19B and FIG. 19C, the top surface 1211 of the platform body 1210 forms a driving channel, and slope surfaces 1220A of the two slope platforms 1220 respectively form a drive-in channel and a drive-out channel. Tops of the drive-in channel and the drive-out channel are respectively connected to the driving channels (lines with arrows in the figure show driving directions of the drive-in channel, the driving channel, and the drive-out channel). In this way, the first robot may drive along the drive-in channel to the driving channel on the platform body 1210, and drive along the driving channel to the drive-out channel, and then drive out the drive-out channel. This can improve the efficiency of cargo carrying and transit.

In an example, there are three slope platforms 1220, slope surfaces 1220A of two of the slope platforms 1220 may be set as two drive-in channels, and a slope surface 1220A of the other slope platform 1220 is set as the drive-out channel. The tops of the drive-in channels and the drive-out channel are respectively connected to the driving channel. The number of the drive-in and drive-out channels may be selected and adjusted according to actual needs, which is not limited in this embodiment of the present disclosure.

In an implementation, the width of the platform body 1210 is greater than the width of the slope platform 1220, so that the first robot transfers a cargo with a larger size on the platform body 1210.

In an implementation, as shown in FIG. 19A to FIG. 19C and FIG. 22, a platform bracket 1511 adapted to the shape of the platform body 1210 is arranged inside the platform body 1210, and a slope bracket 1521 adapted to the shape of the slope platform 1220 is arranged inside the slope platform 1220.

In an example, the platform bracket 1511 is provided with a platform support plate 1512 to form the platform body 1210; and the slope bracket 1521 is provided with a slope support plate 1522 to form the slope platform 1220.

Figure 23:
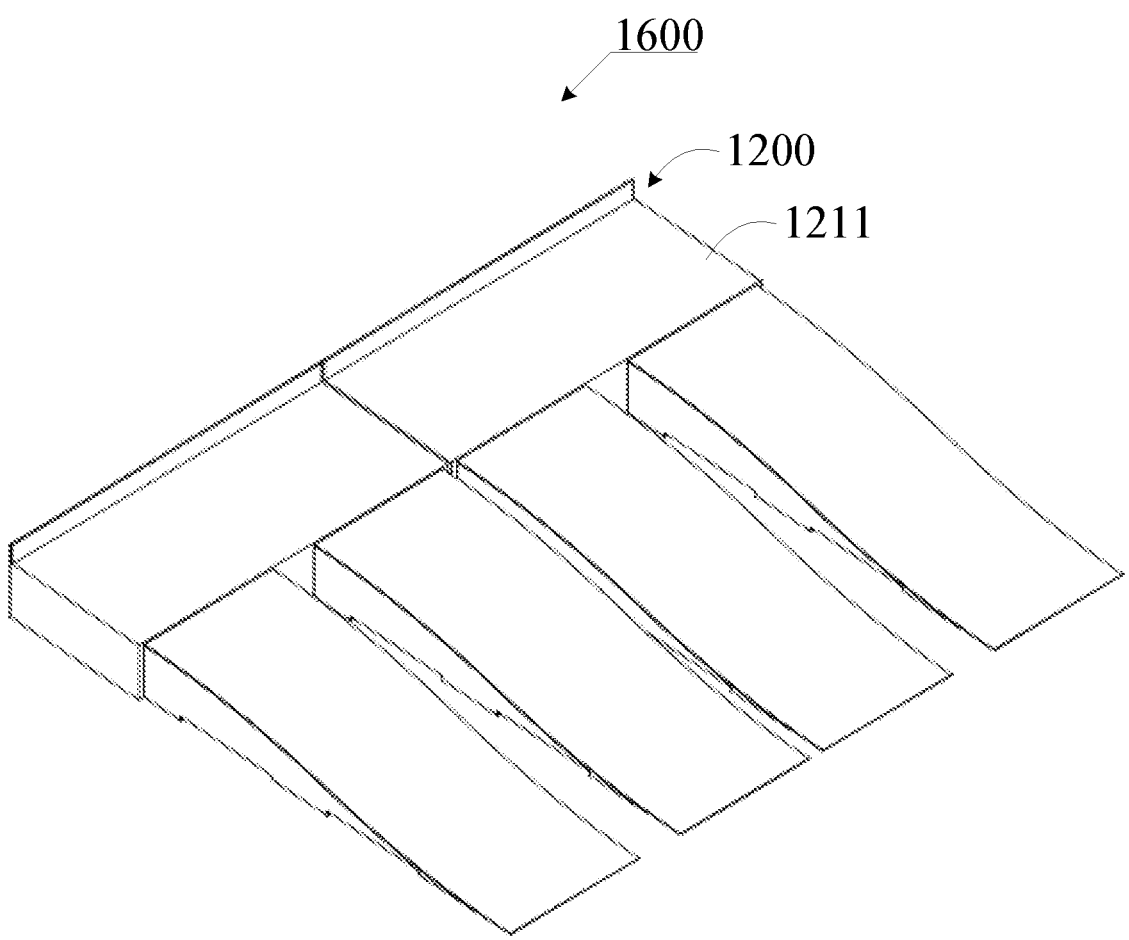
FIG. 23 shows a schematic structural diagram of a workstation according to Embodiment 5 of the present disclosure.

FIG. 23 shows a schematic structural diagram of a workstation according to Embodiment 5 of the present disclosure. As shown in FIG. 23, the workstation 1600 may include: a plurality of docking platforms 1200 according to any one of the foregoing implementations, and the plurality of docking platforms 1200 are arranged along the length direction of the platform body 1210, so that top surfaces 1211 of the plurality of platform bodies 1210 are engaged. In this way, it is convenient for the first robot to drive along the top surfaces 1211 of the plurality of platform bodies 1210, and a drive-in channel and a drive-out channel may also be flexibly configured.

Other components of the docking platform 1200 and the workstation 1600 in the foregoing embodiments may adopt various technical solutions known to those of ordinary skill in the art now and in the future, which will not be described in detail herein.

According to the docking platform 1200 and the workstation 1600 of the present disclosure, the slope surface 1220A of the slope platform 1220 is set as the concave slope surface 1221 and the convex slope surface 1222 along the direction from a slope bottom to a slope top, and the concave slope surface 1221 is smoothly connected to the convex slope surface 1222, and the slope surface 1220A is smoothly engaged with the top surface 1211 of the platform body 1210, which is beneficial to shorten the length of the slope platform 1220, and may reduce the manufacturing cost and space occupation.

In the description of this specification, it should be understood that terms "center," "longitudinal," "lateral," "length," "width," "thickness," "up," "down," "front," "rear," "left," "right," "vertical," "horizontal," "top," "bottom," "inner," "outer," "clockwise," "counterclockwise," "axial," "radial," "circumferential," and the like indicate orientations or position relationships based on the orientations or position relationships shown in the drawings, which are only for ease of describing the present disclosure and simplifying the description, rather than indicating or implying that the indicated apparatus or element must have a specific orientation, be configured and operated in a specific orientation, and therefore cannot be understood as a limitation of the present disclosure.

In addition, terms "first" and "second" are used for the purpose of description only, and are not to be understood as indicating or implying relative importance or implicitly indicating the number of technical features indicated. Thus, the features defined by "first" or "second" may explicitly or implicitly include one or more of the features. In the description of the present disclosure, "a plurality of" means two or more, unless specifically defined otherwise.

In the present disclosure, unless specifically defined and limited otherwise, terms "installed," "linked," "connected," "fixed," and the like should be understood in a broad sense, for example, it may be a fixed connection, a detachable connection, or a whole; it may be a mechanical connection, an electrical connection, or a communication; it may be a direct link or an indirect link through an intermediary, and it may be an internal connection between two elements or an interaction relationship between two elements. For a person of ordinary skill in the art, the specific meanings of the foregoing terms in the present disclosure may be understood according to specific circumstances.

In the present disclosure, unless specifically defined and limited otherwise, that the first feature is "above" or "below" the second feature may include the direct contact of the first feature and the second feature, and may also include the indirect contact of the first feature and the second feature through some other features between them, rather than the direct contact. Moreover, that the first feature is "above," "over" or "upward" the second feature includes the first feature being directly above and obliquely above the second feature, or it simply means that a horizontal height of the first feature is higher than that of the second feature. That the first feature is "below," "underneath" or "under" the second feature includes the first feature being directly below and obliquely below the second feature, or it simply means that a horizontal height of the first feature is lower than that of the second feature.

The foregoing disclosure provides many different implementations or examples for realizing different structures of the present disclosure. To simplify the content of the present disclosure, components and settings of specific examples are described above. They are certainly only examples, and are not intended to limit the present disclosure. In addition, the present disclosure may repeat reference numerals and/or reference letters in different examples, and this repetition is for the purpose of simplification and clarity, and does not indicate relationships between various implementations and/or settings that are discussed.

What are described above are only specific implementations of the present disclosure, but the protection scope of the present disclosure is not limited to this. Any person skilled in the art may easily think of variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. A warehousing apparatus, comprising:
at least one temporary storage layer board, wherein the at least one temporary storage layer board is used to provide a temporary storage position;
at least one shelf, wherein the at least one shelf comprises at least one storage layer board and a plurality of columns spaced apart in a horizontal direction, the at least one storage layer board is used to provide a storage position, and the at least one storage layer board is arranged spaced above or below the at least one temporary storage layer board in a vertical direction between the plurality of columns;
a first robot channel for a first robot to drive, wherein the first robot is used to access cargo on the at least one temporary storage layer board; and
a second robot channel for a second robot to drive, wherein the second robot is used to transfer the cargo between the at least one temporary storage layer board and the at least one storage layer board;
wherein the warehousing apparatus further comprises a docking platform, wherein the first robot channel comprises a fifth driving channel, the fifth driving channel is located between the docking platform and the at least one shelf, and the docking platform comprises:
a platform body; and
a slope platform, wherein a slope surface of the slope platform comprises a concave slope surface and a convex slope surface that are arranged in a direction from a slope bottom to a slope top, and a top edge of the concave slope surface is smoothly connected to a bottom edge of the convex slope surface;
wherein the slope platform is arranged on one side of the platform body, so that the slope surface is smoothly engaged with a top surface of the platform body.

2. The warehousing apparatus of claim 1, wherein the first robot channel comprises a cargo access channel and the cargo access channel is located below the at least one temporary storage layer board.

3. The warehousing apparatus of claim 2, wherein the cargo access channel is further used for the first robot to drive when the first robot is unloaded.

4. The warehousing apparatus of claim 1, wherein the plurality of columns are arranged on a periphery of the at least one storage layer board, the first robot channel comprises a first driving channel, and the first driving channel is located between a side of the at least one temporary storage layer board and the plurality of columns along a first direction.

5. The warehousing apparatus of claim 4, wherein the at least one shelf comprises two temporary storage layer boards arranged opposite to each other in the first direction, and the first driving channel is located between the two temporary storage layer boards.

6. The warehousing apparatus of claim 4, wherein the first robot channel comprises a second driving channel, the second driving channel is located between an end of the at least one temporary storage layer board and the plurality of columns along a second direction, and the second direction is vertical to the first direction.

7. The warehousing apparatus of claim 6, wherein the at least one temporary storage layer board comprises a plurality of temporary storage boards for providing the temporary storage position, the first robot channel comprises a third driving channel, and the third driving channel is located between at least two of the plurality of temporary storage boards.

8. The warehousing apparatus of claim 7, wherein the at least one shelf is a plurality of shelves, the first robot channel comprises a fourth driving channel; the fourth driving channel is located between two adjacent shelves of the plurality of shelves, and connects the third driving channel of the two adjacent shelves and/or the second driving channel of the two adjacent shelves.

9. The warehousing apparatus of claim 1, wherein the second robot channel is located on a periphery of the at least one shelf, and the second robot channel comprises a channel between adjacent shelves when there are a plurality of shelves.

10. The warehousing apparatus of claim 1, wherein the at least one temporary storage layer board is arranged on the at least one shelf.

11. The warehousing apparatus of claim 1, wherein a projection of the concave slope surface in the vertical direction is a first arc, a projection of the convex slope surface in the vertical direction is a second arc, and an arc radius of the first arc is greater than or equal to an arc radius of the second arc.

12. The warehousing apparatus of claim 1, wherein a side wall of the platform body opposite to the slope platform is provided with a clamping groove, a side wall of the slope platform opposite to the platform body is provided with a clamping strip, and the clamping strip is clamped in the clamping groove, so that the slope platform is clamped with the platform body; the clamping groove is arranged along a length direction of the platform body, and the clamping strip is arranged along a width direction of the slope platform;
wherein there are at least two slope platforms, and clamping strips of two of the slope platforms is slidable along the clamping groove to adjust a spacing.

13. The warehousing apparatus of claim 1, wherein the at least one temporary storage layer board comprises a first cross beam arranged along a horizontal direction and a plurality of temporary storage members arranged at an interval on an inner side of the first cross beam; each of two ends of the first cross beam is fixed to a column; each of the temporary storage members comprises two support arms and a furcal groove formed between the two support arms, and the furcal groove is used to cooperate with a furcal arm of the first robot to access the cargo.

14. An in-warehouse control method for storing cargo, comprising:
determining a target temporary storage position according to a target storage position of a target cargo;
instructing a first robot to transfer the target cargo to the target temporary storage position; and
when a warehousing apparatus receives a transfer completion signal sent by the first robot, instructing a second robot to transfer the target cargo from the target temporary storage position to the target storage position;
wherein the determining the target temporary storage position according to the target storage position of the target cargo, comprises:
determining a first idle temporary storage position closest to the target storage position;
instructing the first robot to drive toward the first idle temporary storage position;

during a driving process of the first robot, updating an occupancy status of each of temporary storage positions based on a preset time interval;

when a time that the first robot drives to the first idle temporary storage position is greater than a first preset time threshold, determining whether there is a second idle temporary storage position closer to the target storage position according to an updated occupancy status of each of the temporary storage positions; and when there is the second idle temporary storage position closer to the target storage position, determining the second idle temporary storage position as the target temporary storage position.

15. The method of claim 14, wherein the instructing the first robot to transfer the target cargo to the target temporary storage position, comprises:

determining a first transfer route from the first robot channel according to position information between the first robot and the target temporary storage position; and instructing the first robot to drive to a lower side of the target temporary storage position along the first transfer route.

16. The method of claim 15, wherein the first robot channel comprises a cargo access channel located below at least one temporary storage layer board, and the method further comprises:

when the first robot is unloaded, determining an unloaded driving route from the first robot channel; and instructing the first robot to drive along the unloaded driving route.

17. The method of claim 14, wherein the instructing the second robot to transfer the target cargo from the target temporary storage position to the target storage position, comprises:

determining a second transfer route from the second robot channel according to position information between the second robot and the target temporary storage position; and instructing the second robot to drive to a side of the target temporary storage position along the second transfer route.

18. A warehouse control method for transferring cargo away from a warehouse, comprising:

instructing a second robot to transfer a target cargo away from a current storage position;

determining a target temporary storage position according to a position of the second robot;

instructing the second robot to transfer the target cargo to the target temporary storage position; and when a warehousing apparatus receives a transfer completion signal sent by the second robot, instructing the first robot to transfer the target cargo away from the target temporary storage position;

wherein the determining the target temporary storage position according to the position of the second robot, comprises:

determining a first idle temporary storage position closest to the second robot;

instructing the second robot to drive toward the first idle temporary storage position;

during a driving process of the second robot, updating an occupancy status of each of temporary storage positions based on a preset time interval;

when a time that the second robot drives to the first idle temporary storage position is greater than a second preset time threshold, determining whether there is a second idle temporary storage position closest to the second robot according to an updated occupancy status of each of the temporary storage positions; and when there is the second idle temporary storage position closer to the target storage position, determining the second idle temporary storage position as the target temporary storage position.

19. The method of claim 18, wherein the instructing the first robot to transfer the target cargo away from the target temporary storage position, comprises:

determining a first transfer route from the first robot channel according to position information between the first robot and the target temporary storage position; and instructing the first robot to drive to a lower side of the target temporary storage position along the first transfer route.

20. A warehousing system, comprising:

a warehousing apparatus, comprising:
at least one temporary storage layer board, wherein the at least one temporary storage layer board is used to provide a temporary storage position;
at least one shelf, wherein at least one shelf comprises at least one storage layer board and a plurality of columns spaced apart in a horizontal direction, the at least one storage layer board is used to provide a storage position, and the at least one storage layer board is arranged spaced above or below the at least one temporary storage layer board in a vertical direction between the plurality of columns;
a first robot channel for a first robot to drive, wherein the first robot is used to access cargo on the at least one temporary storage layer board; and
a second robot channel for a second robot to drive, wherein the second robot is used to transfer the cargo between the at least one temporary storage layer board and the at least one storage layer board; and a control device, comprising a processor and a memory, wherein the memory stores instructions, and the instructions, when being loaded and executed by the processor, implement an in-warehouse control method for storing cargo; wherein the in-warehouse control method for storing the cargo comprises: determining a target temporary storage position according to a target storage position of a target cargo; instructing a first robot to transfer the target cargo to the target temporary storage position; and when a warehousing apparatus receives a transfer completion signal sent by the first robot, instructing a second robot to transfer the target cargo from the target temporary storage position to the target storage position;

wherein the warehousing apparatus further comprises a docking platform, wherein the first robot channel comprises a fifth driving channel, the fifth driving channel is located between the docking platform and the at least one shelf, and the docking platform comprises:

a platform body; and a slope platform, wherein a slope surface of the slope platform comprises a concave slope surface and a convex slope surface that are arranged in a direction from a slope bottom to a slope top, and a top edge of the concave slope surface is smoothly connected to a bottom edge of the convex slope surface;

wherein the slope platform is arranged on one side of the platform body, so that the slope surface is smoothly engaged with a top surface of the platform body.

21. The warehousing system of claim 20, wherein the first robot is provided with a liftable furcal arm.

22. The warehousing system of claim 20, wherein the second robot comprises a liftable access mechanism, and a maximum height of the access mechanism is greater than a height of the at least one shelf, and/or a minimum height of the access mechanism is less than a height of the at least one temporary storage layer board.

23. The warehousing system of claim 20, wherein the second robot comprises a plurality of cargo placing platforms arranged at intervals spaced apart along the vertical direction.

* * * * *